United States Patent
Li et al.

(10) Patent No.: US 12,241,968 B2
(45) Date of Patent: Mar. 4, 2025

(54) RADAR RANGING METHOD AND DEVICE, RADAR AND IN-VEHICLE SYSTEM

(71) Applicant: HUAWEI TECHNOLOGIES CO., LTD., Guangdong (CN)

(72) Inventors: Qiang Li, Beijing (CN); Hongying Wu, Beijing (CN)

(73) Assignee: Shenzhen Yinwang Intelligent Technologies Co., Ltd., Shenzhen (CN)

(*) Notice: Subject to any disclaimer, the term of this patent is extended or adjusted under 35 U.S.C. 154(b) by 332 days.

(21) Appl. No.: 17/845,337

(22) Filed: Jun. 21, 2022

(65) Prior Publication Data
US 2022/0334244 A1 Oct. 20, 2022

Related U.S. Application Data

(63) Continuation of application No. PCT/CN2019/127474, filed on Dec. 23, 2019.

(51) Int. Cl.
G01S 13/89 (2006.01)
G01S 7/292 (2006.01)
G01S 13/931 (2020.01)

(52) U.S. Cl.
CPC .......... *G01S 13/89* (2013.01); *G01S 7/292* (2013.01); *G01S 13/931* (2013.01)

(58) Field of Classification Search
CPC ......... G01S 13/89; G01S 7/292; G01S 13/931
See application file for complete search history.

(56) References Cited

U.S. PATENT DOCUMENTS 5,437,506 A 8/1995 Gray
7,151,481 B1 12/2006 Strecker et al.
2009/0123158 A1 5/2009 Ray et al.
2013/0286376 A1 10/2013 Rousseau
2017/0039822 A1 2/2017 Schlesinger et al.
(Continued)

FOREIGN PATENT DOCUMENTS

CN 101364812 A 2/2009
CN 102621540 A 8/2012
(Continued)

OTHER PUBLICATIONS

Zhu et al. "Saturated Echo Signal Algorithm for Wide Dynamic Range Lidar," Acta Photonica Sinica, vol. 47, Issue 12 1228003 (Year: 2018).*
Zheng et al. "A Linear Dynamic Range Receiver With Timing Discrimination for Pulsed TOF Imaging LADAR Application," IEEE Transactions on Instrumentation and Measurement, vol. 67, No. 11, Nov. 2018 pp. 2684-2691 (Year: 2018).*
(Continued)

*Primary Examiner* — James R Hulka
*Assistant Examiner* — Samarina Makhdoom
(74) *Attorney, Agent, or Firm* — Fish & Richardson P.C.

(57) ABSTRACT

The disclosure provides a radar ranging method and device, a radar, and an in-vehicle system. An example method includes: obtaining a pulse waveform of a transmit signal sent to a target object by a radar; obtaining a sampling sequence of an echo signal received by the radar; determining, in sampling points on a rising edge of the sampling sequence, a first timing point used to indicate a receive moment of the echo signal; determining, based on the first timing point and the pulse waveform of the transmit signal, a second timing point used to indicate a transmit moment of the transmit signal; and calculating a distance between the radar and the target object based on the first timing point and the second timing point.

19 Claims, 11 Drawing Sheets

(56) References Cited

U.S. PATENT DOCUMENTS

| | | | |
|---|---|---|---|
| 2017/0090019 A1 | | 3/2017 | Slobodyanyuk et al. |
| 2017/0097405 A1 | | 4/2017 | Lerner |
| 2019/0170855 A1 | * | 6/2019 | Keller .................. G01S 7/2926 |
| 2019/0293770 A1 | * | 9/2019 | Subasingha ........... G01S 7/4865 |

FOREIGN PATENT DOCUMENTS

| | | | | |
|---|---|---|---|---|
| CN | 102706958 A | | 10/2012 | |
| CN | 106443707 A | | 2/2017 | |
| CN | 107037131 A | | 8/2017 | |
| CN | 107204021 A | | 9/2017 | |
| CN | 107328987 A | | 11/2017 | |
| CN | 108008398 A | | 5/2018 | |
| CN | 108732553 A | * | 11/2018 | ............. G01S 17/42 |
| CN | 109116302 A | | 1/2019 | |
| CN | 109407088 A | | 3/2019 | |
| CN | 109459757 A | | 3/2019 | |
| CN | 109581362 A | | 4/2019 | |
| CN | 109581399 A | | 4/2019 | |
| CN | 110031821 A | | 7/2019 | |
| CN | 110031854 A | | 7/2019 | |
| CN | 110073611 A | | 7/2019 | |
| CN | 110146848 A | | 8/2019 | |
| CN | 110146868 A | | 8/2019 | |
| CN | 110244311 A | | 9/2019 | |
| CN | 110488251 A | | 11/2019 | |
| WO | 2018033412 A1 | | 2/2018 | |
| WO | 2019183273 A1 | | 9/2019 | |

OTHER PUBLICATIONS

Merabti et al., "Robust Nonlinear Acoustic Echo Cancellation using a Metaheuristic Optimization Approach," 2015 IEEE International Conference on Digital Signal Processing (DSP), Jul. 21-24, 2015, 5 pages.

Ing et al., "Time Synchronization in Sensor Network with Pulse-coupled Oscillator," Journal of Astronautics, vol. 30, No. 3, May 2009, 6 pages (with English abstract).

Zhu et al., "Saturated Echo Signal Algorithm for Wide Dynamic Range Lidar," Acta Photonica Sinica, vol. 47, No. 12, Dec. 2018, 13 pages (with an English machine translation).

Hu et al., "Method for Solving Echo Time of Pulse Laser Ranging Based on Deep Learning," Chinese Journal of Lasers, vol. 46, No. 10, Oct. 2019, 10 pages (with English abstract).

Wei et al., "A Simulation Model for Evaluating Delay at Signalized Intersection under Over-saturated Situation," Systems Engineering—theory and Practice, vol. 11, Nov. 2000, 6 pages (with English abstract).

Office Action in Chinese Appln. No. 201980060240.1, dated Mar. 2, 2022, 6 pages (with English translation).

Office Action in Chinese Appln. No. 201980060240.1, dated Dec. 29, 2021, 15 pages (with English translation).

Office Action in Chinese Appln. No. 201980060240.1, dated Sep. 30, 2021, 30 pages (with English translation).

International Search Report and Written Opinion in International Appln. No. PCT/CN2019/127474, mailed on Oct. 9, 2020, 16 pages (with English translation).

* cited by examiner

RADAR RANGING METHOD AND DEVICE, RADAR AND IN-VEHICLE SYSTEM

CROSS-REFERENCE TO RELATED APPLICATIONS

This application is a continuation of International Application No. PCT/CN2019/127474, filed on Dec. 23, 2019, the disclosure of which is hereby incorporated by reference in its entirety.

TECHNICAL FIELD

This application relates to the field of radars, and in particular, to a radar ranging method and device, a radar, and an in-vehicle system.

BACKGROUND

A radar has a plurality of types such as a laser radar (light detection and ranging, LIDAR), a laser range finder, and a millimeter-wave radar. The radar can implement functions such as ranging, target detection, and tracking and imaging recognition, and can be applied to fields such as intelligent transportation, autonomous driving, atmospheric environment monitoring, geographic mapping, and unscrewed aerial vehicles.

Ranging is a basic function of the radar. FIG. 2 is a schematic diagram of a radar 200. As shown in FIG. 2, the radar 200 includes a transmitter 220, a receiver 230, and a processing unit 210. In a ranging process, the transmitter 220 transmits a transmit signal to a target object, and the receiver 230 receives an echo signal reflected by the target object. The processing unit 210 is configured to determine a time difference between a transmit moment and a receive moment, and the time difference may be referred to as time of flight (time of flight, TOF). The processing unit 210 may calculate a distance between the radar and the target object based on a light speed and the time of flight.

To precisely calculate the time of flight, the radar needs to use timing points at same locations on a transmit signal waveform and an echo signal waveform, and a time difference between the timing points is the time of flight. FIG. 3(a) and FIG. 3(b) are schematic diagrams of transmit pulses and receive pulses. As shown in FIG. 3(a), if peak time points of the transmit pulse and the receive pulse are used as timing points, a time difference between the two timing points is time of flight. Alternatively, if moments at which the transmit pulse and the receive pulse reach ½ of a peak amplitude are used as timing points, a time difference between the two timing points is time of flight. Generally, provided that a time point at which a fixed proportion of a peak amplitude of a pulse waveform is reached is used as a timing point, time of flight obtained through calculation is the same. For example, locations of ½, ¼, and ⅛ of the peak amplitude of the pulse waveform may be selected as the timing point.

However, a receiver may receive saturated echo signals sometimes due to differences in distances and reflectances of target objects. The saturated echo signal may be understood as that strength of an echo signal is too high and exceeds a dynamic range of the receiver. Consequently, echo signal clipping is caused, and usually broadening of a falling edge is accompanied with. For example, FIG. 3(b) shows a case in which a received echo signal is a saturated echo. Because a peak location and a peak amplitude of the saturated echo cannot be determined, a location of a timing point with a fixed proportion cannot be found. This results in an inability to precisely calculate the time of flight, and a distance error obtained through calculation is increased.

Therefore, in the case of radar ranging, how to find the timing point for the saturated echo signal, and perform precise time of flight calculation and distance estimation, is an urgent problem to be resolved in the industry.

SUMMARY

This application provides a radar ranging method and device, a radar, and an in-vehicle system, to improve radar ranging precision.

According to a first aspect, a radar ranging method is provided. The method may be performed by a radar. The radar may include a laser radar, a laser range finder, a millimeter-wave radar, or the like. The radar may be applied to a vehicle-mounted field, for example, intelligent vehicles, autonomous vehicles, unmanned vehicles, unscrewed aerial vehicles, and the like. The method may be specifically performed by a processor or a processing unit in the radar. The method includes: obtaining a pulse waveform of a transmit signal, where the transmit signal is a signal sent to a target object by the radar; obtaining a sampling sequence of an echo signal, where the echo signal is a reflection signal of the target object that is received by the radar, and the echo signal is a saturated echo signal; determining a first timing point in at least one sampling point on a rising edge of the sampling sequence, where the first timing point is used to indicate a receive moment of the echo signal; determining a second timing point based on the first timing point and the pulse waveform of the transmit signal, where the second timing point is used to indicate a transmit moment of the transmit signal; and calculating a distance between the radar and the target object based on the first timing point and the second timing point.

In this embodiment of this application, in a radar ranging process, after the sampling sequence of the saturated echo signal is obtained, the first timing point may be selected from the at least one sampling point on the rising edge of the sampling sequence, and the first timing point is used as the receive moment of the echo signal. Then, the second timing point is determined based on the first timing point and the waveform of the transmit signal, and the second timing point is used as the transmit moment of the transmit signal. Because the first timing point is selected from the sampling points on the rising edge of the saturated sampling sequence, moment information and amplitude information that correspond to the first timing point are true information on the echo signal. In addition, in the foregoing solution, a location of the first timing point is first determined, and then a location of the second timing point is determined based on the location of the first timing point. In this manner, the timing point is determined based on the true information of the echo signal as much as possible, so that precision of determining time of flight can be improved when the saturated echo signal is received, thereby further improving radar ranging precision. If a preset timing point is a fixed location on the saturated echo signal and the transmit signal, a location of a non-sampling point on the saturated sampling sequence may be selected as the timing point. This makes moment information and amplitude information of the timing point not precise, thereby reducing radar ranging precision.

Optionally, if the rising edge of the sampling sequence includes a plurality of unsaturated sampling points, one sampling point may be randomly selected from the plurality of unsaturated sampling points as the first timing point.

Optionally, if the rising edge of the sampling sequence includes a plurality of unsaturated sampling points, the last unsaturated sampling point on the rising edge of the sampling sequence may be selected as the first timing point. Because the saturated echo signal is a signal on which echo signal clipping occurs, and an amplitude of the signal is lower than a normal amplitude, the last unsaturated sampling point on the rising edge may be selected as the first timing point. That is, an amplitude of the first timing point is as high as possible, so that the time of flight obtained through calculation is more precise.

Optionally, if the rising edge of the sampling sequence includes only one unsaturated sampling point, the unsaturated sampling point may be selected as the first timing point.

Optionally, if the rising edge of the sampling sequence does not include an unsaturated sampling point, the first saturated sampling point on the rising edge may be selected as the first timing point.

In this embodiment of this application, an appropriate timing point may be flexibly and dynamically selected on the rising edge of the saturated sampling sequence based on different degrees of saturation severity of the received saturated sampling sequence, to improve precision of determining the time of flight, and further improve radar ranging precision.

With reference to the first aspect, in a possible implementation, when a saturation degree of the saturated sampling sequence is relatively light, for example, the rising edge of the saturated sampling sequence includes a plurality of unsaturated sampling points, the second timing point may be determined in the first manner, and the manner includes: fractionally scaling an amplitude of the sampling sequence based on a preset fractional scale factor a, to obtain a fractionally scaled sampling sequence, where 0<a<1; calculating a delay factor $\Delta T$, where $\Delta T=T_{D1}-Ta$, Ta represents a moment at which an amplitude of the fractionally scaled sampling sequence reaches $a \times V_{TD1}$, $V_{TD1}$ represents an amplitude of the first timing point on the sampling sequence, and $T_{D1}$ represents a moment of the first timing point; and calculating the second timing point based on the fractional scale factor a, the delay factor $\Delta T$, and the pulse waveform of the transmit signal.

In this embodiment of this application, in a radar ranging process, after the sampling sequence of the saturated echo signal is obtained, the first timing point may be selected from the sampling points of the sampling sequence, the delay factor $\Delta T$ is determined based on the preset fractional scale factor a and the first timing point, and then the second timing point is determined based on the fractional scale factor a and the delay factor $\Delta T$. Because the first timing point is selected from the sampling points on the rising edge of the saturated sampling sequence, moment information and amplitude information that correspond to the first timing point are true information on the echo signal. In this manner, when the saturated echo signal is received, precision of determining the time of flight is improved, thereby further improving radar ranging precision. In addition, the timing point is determined based on the fractional scale factor a and the delay factor $\Delta T$, and this can reduce impact of the saturated echo signal on determining a location of the timing point, improve precision of determining a relative location of the second timing point, and further improve radar ranging precision.

With reference to the first aspect, in a possible implementation, a specific manner of calculating the second timing point in the foregoing first manner includes: fractionally scaling an amplitude of the pulse waveform of the transmit signal based on the fractional scale factor a, to obtain a fractionally scaled pulse waveform; translating the pulse waveform of the transmit signal to the right based on the delay factor $\Delta T$, to obtain a delayed pulse waveform; calculating an intersection point between the fractionally scaled pulse waveform and the delayed pulse waveform; and determining the intersection point as the second timing point.

With reference to the first aspect, in a possible implementation, the calculating an intersection point between the fractionally scaled pulse waveform and the delayed pulse waveform includes: determining the intersection point according to the following formula:

$$\hat{t} = \underset{t}{\operatorname{argmin}} |f(t-\Delta T) - a \times f(t)|,$$

where $f(t-\Delta T)$ represents the delayed pulse waveform, $a \times f(t)$ represents the fractionally scaled pulse waveform, and $\hat{t}$ represents a moment of the intersection point.

With reference to the first aspect, in a possible implementation, if a saturation degree of the sampling sequence is relatively severe, for example, when the rising edge of the sampling sequence includes only one unsaturated sampling point, or when the rising edge of the sampling sequence does not include an unsaturated sampling point, the second timing point may be determined in the second manner. In the second manner, the determining a second timing point based on the first timing point and the pulse waveform of the transmit signal includes: determining a confidence interval of the second timing point on the pulse waveform of the transmit signal based on the first timing point; and determining the second timing point based on the confidence interval of the second timing point.

In this embodiment of this application, the first timing point may be first selected on the sampling sequence of the saturated echo signal, then the confidence interval of the second timing point is determined on the transmit signal based on the first timing point, and the second timing point is determined based on the confidence interval, to calculate the distance between the radar and the target object. When the saturation degree of the saturated echo signal is relatively severe, the confidence space of the second timing point is calculated by a boundary condition, and the location of the second timing point is determined. This can reduce timing ambiguity and improve radar ranging precision.

With reference to the first aspect, in a possible implementation, the determining a confidence interval of the second timing point on the pulse waveform of the transmit signal based on the first timing point includes: determining a first confidence interval [T1, T2] of the second timing point based on a first boundary condition, where the first boundary condition includes: an amplitude of a previous sampling point of the first timing point is 0; determining a right boundary moment T4 of a confidence interval [T3, T4] of the second timing point based on the first confidence interval [T1, T2] and a second boundary condition, where [T3, T4]∈ [T1, T2], and the second boundary condition includes: a next sampling point of the first timing point is a saturated sampling point; and determining a left boundary moment T3 of the confidence interval [T3, T4] of the second timing point based on the first confidence interval [T1, T2] and a third boundary condition, where the third boundary condition includes: that an amplitude of the transmit signal at a preset saturation alert point reaches a saturation threshold $V_{max}$ is a little probability event.

Optionally, the boundary condition may be replaced with another boundary condition satisfied by the second timing point, or a boundary condition satisfied by another second timing point may be further added, to determine the confidence space of the second timing point.

With reference to the first aspect, in a possible implementation, the determining a first confidence interval [T1, T2] of the second timing point based on a first boundary condition includes: determining the first confidence interval [T1, T2] of the second timing point based on the first boundary condition, where T1 is a moment at which an amplitude of the transmit signal reaches a threshold $V_{tx,min}$, $V_{tx,min}=k\times V_{TD1}$, $V_{TD1}$ represents an amplitude of the first timing point on the sampling sequence, 0<k<1, T2=T1+$T_S$, and $T_S$ represents a sampling interval of the sampling sequence.

With reference to the first aspect, in a possible implementation, the determining a right boundary moment T4 of a confidence interval [T3, T4] of the second timing point based on the first confidence interval [T1, T2] and a second boundary condition includes: determining the right boundary moment T4 of the confidence interval [T3, T4] of the second timing point according to the following formula:

$$\hat{V} = V_{TD1} \frac{V_{TX}(T_X + T_S)}{V_{TX}(T_X)},$$

where $T_X$ represents a moment on the left of a moment T1, $V_{TD1}$ represents the amplitude of the first timing point on the sampling sequence, $V_{TX}(T_X)$ represents an amplitude of the transmit signal at the moment $T_X$, $V_{TX}(T_X+T_S)$ represents an amplitude of the transmit signal at the moment $T_X+T_S$, $T_S$ represents the sampling interval of the sampling sequence, and $\hat{V}$ represents a predicted value of the sampling sequence at a next sampling point of the first timing point; and the moment T4 is the moment $T_X$ at which $\hat{V}$ reaches the saturation threshold $V_{max}$ of the sampling sequence.

With reference to the first aspect, in a possible implementation, the determining a left boundary moment T3 of the confidence interval [T3, T4] of the second timing point based on the first confidence interval [T1, T2] and a third boundary condition includes: determining the left boundary moment T3 of the second confidence interval [T3, T4] according to the following formula:

$$\hat{V}_{T5} = V_{TD1} \frac{V_{TX}(T5)}{V_{TX}(T_y)},$$

where $V_{TD1}$ represents the amplitude of the first timing point on the sampling sequence, $V_{TX}(T_y)$ represents an amplitude of the transmit signal at the moment $T_y$, $V_{TX}(T5)$ represents an amplitude of the transmit signal at the moment T5, the moment T5 is a moment at which the saturation alert point is on the transmit signal, and $\hat{V}_{T5}$ represents a predicted value of an amplitude of the saturation alert point on the sampling sequence; and the moment T3 is the moment $T_y$ at which $\hat{V}_{T5}$ is lower than the saturation threshold $V_{max}$ of the sampling sequence.

With reference to the first aspect, in a possible implementation, the determining the second timing point based on the confidence interval of the second timing point includes: determining the second timing point according to the following formula:

$$T_{D2} = \frac{T3 + T4}{2},$$

where $T_{D2}$ represents a moment of the second timing point, T3 represents the left boundary moment of the confidence interval, and T4 represents the right boundary moment of the confidence interval.

With reference to the first aspect, in a possible implementation, the calculating a distance between the radar and the target object based on the first timing point and the second timing point includes: determining the distance according to the following formula: $R=(T_{D1}-T_{D2})\times c/2$, where R represents the distance, $T_{D1}$ represents the moment of the first timing point, $T_{D2}$ represents the moment of the second timing point, and c represents a light speed.

Optionally, the pulse waveform of the transmit signal may be obtained in a plurality of manners. For example, in a possible implementation, the obtaining a pulse waveform of a transmit signal includes: obtaining a pulse waveform of a reference signal, where the reference signal is a prestored ideal waveform of the transmit signal; and obtaining the pulse waveform of the transmit signal based on the pulse waveform of the reference signal and a trigger moment of the transmit signal. For another example, in another possible implementation, the obtaining a pulse waveform of a transmit signal includes: obtaining a pulse waveform of a split signal, where the split signal is a signal obtained by splitting the transmit signal, and the split signal returns to the radar through an optical fiber reference optical path with a fixed delay; and translating the pulse waveform of the split signal based on the fixed delay, to obtain the pulse waveform of the transmit signal.

With reference to the first aspect, in a possible implementation, the radar is the laser radar or the laser range finder.

According to a second aspect, a radar ranging device is provided. The computing device is configured to perform the method according to any one of the first aspect or the possible implementations of the first aspect. The computing device may be a processing unit of a radar. The computing device may be connected to a transmitter and a receiver of the radar in a wireless or wired manner. Specifically, the computing device includes: a first obtaining unit, configured to obtain a pulse waveform of a transmit signal, where the transmit signal is a signal sent to a target object by the radar; a second obtaining unit, configured to obtain a sampling sequence of an echo signal, where the echo signal is a reflection signal of the target object that is received by the radar, and the echo signal is a saturated echo signal; a first determining unit, configured to determine a first timing point in at least one sampling point on a rising edge of the sampling sequence, where the first timing point is used to indicate a receive moment of the echo signal; a second determining unit, configured to determine a second timing point based on the first timing point and the pulse waveform of the transmit signal, where the second timing point is used to indicate a transmit moment of the transmit signal; and a computing unit, configured to calculate a distance between the radar and the target object based on the first timing point and the second timing point.

In this embodiment of this application, in a radar ranging process, after the sampling sequence of the saturated echo signal is obtained, the first timing point may be selected from the at least one sampling point on the rising edge of the sampling sequence, and the first timing point is used as the receive moment of the echo signal. Then, the second timing point is determined based on the first timing point and the waveform of the transmit signal, and the second timing point is used as the transmit moment of the transmit signal. Because the first timing point is selected from the sampling points on the rising edge of the saturated sampling sequence, moment information and amplitude information that correspond to the first timing point are true information on the echo signal. In addition, in the foregoing solution, a location of the first timing point is first determined, and then a location of the second timing point is determined based on the location of the first timing point. In this manner, the timing point is determined based on the true information of the echo signal as much as possible, so that precision of determining time of flight can be improved when the saturated echo signal is received, thereby further improving radar ranging precision. If a preset timing point is a fixed location on the saturated echo signal and the transmit signal, a location of a non-sampling point on the saturated sampling sequence may be selected as the timing point. This makes moment information and amplitude information of the timing point not precise, thereby reducing radar ranging precision.

Optionally, if the rising edge of the sampling sequence includes a plurality of unsaturated sampling points, the first determining unit may randomly select one sampling point from the plurality of unsaturated sampling points as the first timing point.

Optionally, if the rising edge of the sampling sequence includes a plurality of unsaturated sampling points, the first determining unit may select the last unsaturated sampling point on the rising edge of the sampling sequence as the first timing point. Because the saturated echo signal is a signal on which echo signal clipping occurs, and an amplitude of the signal is lower than a normal amplitude, the last unsaturated sampling point on the rising edge may be selected as the first timing point. That is, an amplitude of the first timing point is as high as possible, so that the time of flight obtained through calculation is more precise.

Optionally, if the rising edge of the sampling sequence includes only one unsaturated sampling point, the first determining unit may select the unsaturated sampling point as the first timing point.

Optionally, if the rising edge of the sampling sequence does not include an unsaturated sampling point, the first determining unit may select the first saturated sampling point on the rising edge as the first timing point.

In this embodiment of this application, an appropriate timing point may be flexibly and dynamically selected on the rising edge of the saturated sampling sequence based on different degrees of saturation severity of the received saturated sampling sequence, to improve precision of determining the time of flight, and further improve radar ranging precision.

With reference to the second aspect, in a possible implementation, when a saturation degree of the saturated sampling sequence is relatively light, for example, the rising edge of the saturated sampling sequence includes a plurality of unsaturated sampling points, the second determining unit may determine the second timing point in the first manner. In the first manner, the second determining unit is specifically configured to: fractionally scale an amplitude of the sampling sequence based on a preset fractional scale factor a, to obtain a fractionally scaled sampling sequence, where $0<a<1$; calculate a delay factor $\Delta T$, where $\Delta T=T_{D1}-Ta$, Ta represents a moment at which an amplitude of the fractionally scaled sampling sequence reaches $a \times V_{TD1}$, $V_{TD1}$ represents an amplitude of the first timing point on the sampling sequence, and $T_{D1}$ represents a moment of the first timing point; and calculate the second timing point based on the fractional scale factor a, the delay factor $\Delta T$, and the pulse waveform of the transmit signal.

With reference to the second aspect, in a possible implementation, in the foregoing first manner, the second determining unit is specifically configured to: fractionally scale an amplitude of the pulse waveform of the transmit signal based on the fractional scale factor a, to obtain a fractionally scaled pulse waveform; translate the pulse waveform of the transmit signal to the right based on the delay factor $\Delta T$, to obtain a delayed pulse waveform; calculate an intersection point between the fractionally scaled pulse waveform and the delayed pulse waveform; and determine the intersection point as the second timing point.

With reference to the second aspect, in a possible implementation, the second determining unit is specifically configured to determine the intersection point according to the following formula:

$$\hat{t} = \operatorname*{argmin}_{t} |f(t - \Delta T) - a \times f(t)|,$$

where $f(t-\Delta T)$ represents the delayed pulse waveform, $a \times f(t)$ represents the fractionally scaled pulse waveform, and t represents a moment of the intersection point.

With reference to the second aspect, in a possible implementation, if a saturation degree of the sampling sequence is relatively severe, for example, when the rising edge of the sampling sequence includes only one unsaturated sampling point, or when the rising edge of the sampling sequence does not include an unsaturated sampling point, the second timing point may be determined in the second manner. In the second manner, the second determining unit is specifically configured to: determine a confidence interval of the second timing point on the pulse waveform of the transmit signal based on the first timing point; and determine the second timing point based on the confidence interval of the second timing point.

With reference to the second aspect, in a possible implementation, the second determining unit is specifically configured to: determine a first confidence interval [T1, T2] of the second timing point based on a first boundary condition, where the first boundary condition includes: an amplitude of a previous sampling point of the first timing point is 0; determine a right boundary moment T4 of a confidence interval [T3, T4] of the second timing point based on the first confidence interval [T1, T2] and a second boundary condition, where [T3, T4]∈[T1, T2], and the second boundary condition includes: a next sampling point of the first timing point is a saturated sampling point; and determine a left boundary moment T3 of the confidence interval [T3, T4] of the second timing point based on the first confidence interval [T1, T2] and a third boundary condition, where the third boundary condition includes: that an amplitude of the transmit signal at a preset saturation alert point reaches a saturation threshold $V_{max}$ is a little probability event.

Optionally, the boundary condition may be replaced with another boundary condition satisfied by the second timing point, or a boundary condition satisfied by another second timing point may be further added, to determine the confidence space of the second timing point.

With reference to the second aspect, in a possible implementation, the second determining unit is specifically configured to: determine the first confidence interval [T1, T2] of the second timing point based on the first boundary condition, where T1 is a moment at which an amplitude of the transmit signal reaches a threshold $V_{tx,min}$, $V_{tx,min}=k\times V_{TD1}$, $V_{TD1}$ represents an amplitude of the first timing point on the sampling sequence, $0<k<1$, $T2=T1+T_S$, and $T_S$ represents a sampling interval of the sampling sequence.

With reference to the second aspect, in a possible implementation, the second determining unit is specifically configured to: determine the right boundary moment T4 of the confidence interval [T3, T4] of the second timing point according to the following formula:

$$\hat{V} = V_{TD1} \frac{V_{TX}(T_X + T_S)}{V_{TX}(T_X)},$$

where $T_X$ represents a moment on the left of a moment T1, $V_{TD1}$ represents the amplitude of the first timing point on the sampling sequence, $V_{TX}(T_X)$ represents an amplitude of the transmit signal at the moment $T_X$, $V_{TX}(T_X+T_S)$ represents an amplitude of the transmit signal at the moment $T_X+T_S$, $T_S$ represents the sampling interval of the sampling sequence, and $\hat{V}$ represents a predicted value of the sampling sequence at a next sampling point of the first timing point; and the moment T4 is the moment $T_X$ at which $\hat{V}$ reaches the saturation threshold $V_{max}$ of the sampling sequence.

With reference to the second aspect, in a possible implementation, the second determining unit is specifically configured to: determine the left boundary moment T3 of the second confidence interval [T3, T4] according to the following formula:

$$\hat{V}_{T5} = V_{TD1} \frac{V_{TX}(T5)}{V_{TX}(T_y)},$$

where $V_{TD1}$ represents the amplitude of the first timing point on the sampling sequence, $V_{TX}(T_y)$ represents an amplitude of the transmit signal at the moment $T_y$, $V_{TX}(T5)$ represents an amplitude of the transmit signal at the moment T5, the moment T5 is a moment at which the saturation alert point is on the transmit signal, and $\hat{V}_{T5}$ represents a predicted value of an amplitude of the saturation alert point on the sampling sequence; and the moment T3 is the moment $T_y$ at which $\hat{V}_{T5}$ is lower than the saturation threshold $V_{max}$ of the sampling sequence.

With reference to the second aspect, in a possible implementation, the determining the second timing point based on the confidence interval of the second timing point includes: determining the second timing point according to the following formula:

$$T_{D2} = \frac{T3 + T4}{2},$$

where $T_{D2}$ represents a moment of the second timing point, T3 represents the left boundary moment of the confidence interval, and T4 represents the right boundary moment of the confidence interval.

With reference to the second aspect, in a possible implementation, the computing unit is specifically configured to determine the distance according to the following formula: $R=(T_{D1}-T_{D2})\times c/2$, where R represents the distance, $T_{D1}$ represents the moment of the first timing point, $T_{D2}$ represents the moment of the second timing point, and c represents a light speed.

Optionally, that the first obtaining unit may obtain the pulse waveform of the transmit signal in a plurality of manners. For example, in a possible implementation, the first obtaining unit is specifically configured to: obtain a pulse waveform of a reference signal, where the reference signal is a prestored ideal waveform of the transmit signal; and obtain the pulse waveform of the transmit signal based on the pulse waveform of the reference signal and a trigger moment of the transmit signal. For another example, in another possible implementation, the first obtaining unit is specifically configured to: obtain a pulse waveform of a split signal, where the split signal is a signal obtained by splitting the transmit signal, and the split signal returns to the radar through an optical fiber reference optical path with a fixed delay; and translate the pulse waveform of the split signal based on the fixed delay, to obtain the pulse waveform of the transmit signal.

With reference to the second aspect, in a possible implementation, the radar is a laser radar or a laser range finder.

According to a third aspect, a radar is provided. The radar includes: a transmitter, configured to send a transmit signal to a target object; a receiver, configured to receive an echo signal reflected by the target object; and a processing unit, where the processing unit is configured to perform the method according to any one of the first aspect or the possible implementations of the first aspect.

According to a fourth aspect, a computing device is provided. The computing device includes a communications interface; a memory, configured to store a computer program; and a processor, configured to invoke the computer program from the memory, so that when the computer program is executed, the computing device is enabled to perform the method according to any one of the first aspect or the possible implementations of the first aspect.

According to a fifth aspect, an in-vehicle system is provided. The system includes the radar according to the third aspect.

According to a sixth aspect, a computer-readable storage medium is provided, configured to store a computer program. The computer program includes instructions used to perform the method according to any one of the first aspect or the possible implementations of the first aspect.

According to a seventh aspect, a computer program product is provided. The computer program product includes instructions used to perform the method according to any one of the first aspect or the possible implementations of the first aspect.

According to an eighth aspect, a chip is provided. A processing system is disposed on the chip, and the processing system is configured to execute instructions for the method according to any one of the first aspect or the possible implementations of the first aspect.

DETAILED DESCRIPTION OF EMBODIMENTS

The following describes the technical solutions in this application with reference to the accompanying drawings.

Embodiments of this application provide a radar ranging method and device, a radar, and an in-vehicle system, and mainly provide a solution for determining a timing point for a saturated echo signal. This can improve precision of determining time of flight, thereby reducing a distance error of radar ranging.

For ease of understanding the technical solutions of the embodiments of this application, several terms designed in this application are first described.

Saturated echo signal: The saturated echo signal indicates that strength of an echo signal received by a receiver is too high and exceeds a dynamic range of the receiver. Consequently, echo signal clipping is caused, and usually broadening of a falling edge is accompanied with.

Saturated sampling sequence: The saturated sampling sequence refers to a sampling sequence signal obtained after a received saturated echo signal is sampled.

Time of flight: The time of flight refers to a time difference between a transmit moment at which a signal is sent by a radar and a receive moment at which an echo signal is reflected by a target object.

Timing point: The timing point refers to a designated fixed location on a signal waveform transmitted by the radar and an echo signal waveform received by the radar, to determine the time of flight. The time of flight may be obtained by calculating a time difference between two timing points of the transmit signal waveform and the echo signal waveform.

The radar ranging method in the embodiments of this application may be widely used in various fields, such as the field of artificial intelligence, an unmanned driving system, an autonomous driving system, an augmented reality (augmented reality, AR) technology, and a virtual reality (virtual reality, VR) technology. Autonomous driving is a mainstream application in the field of artificial intelligence. An autonomous driving technology relies on collaboration of computer vision, a radar, a monitoring apparatus, a global positioning system, and the like, to enable a motor vehicle to implement autonomous driving without human intervention. For example, the field of autonomous driving may include intelligent vehicles, unmanned vehicles, and the like.

Figure 1:
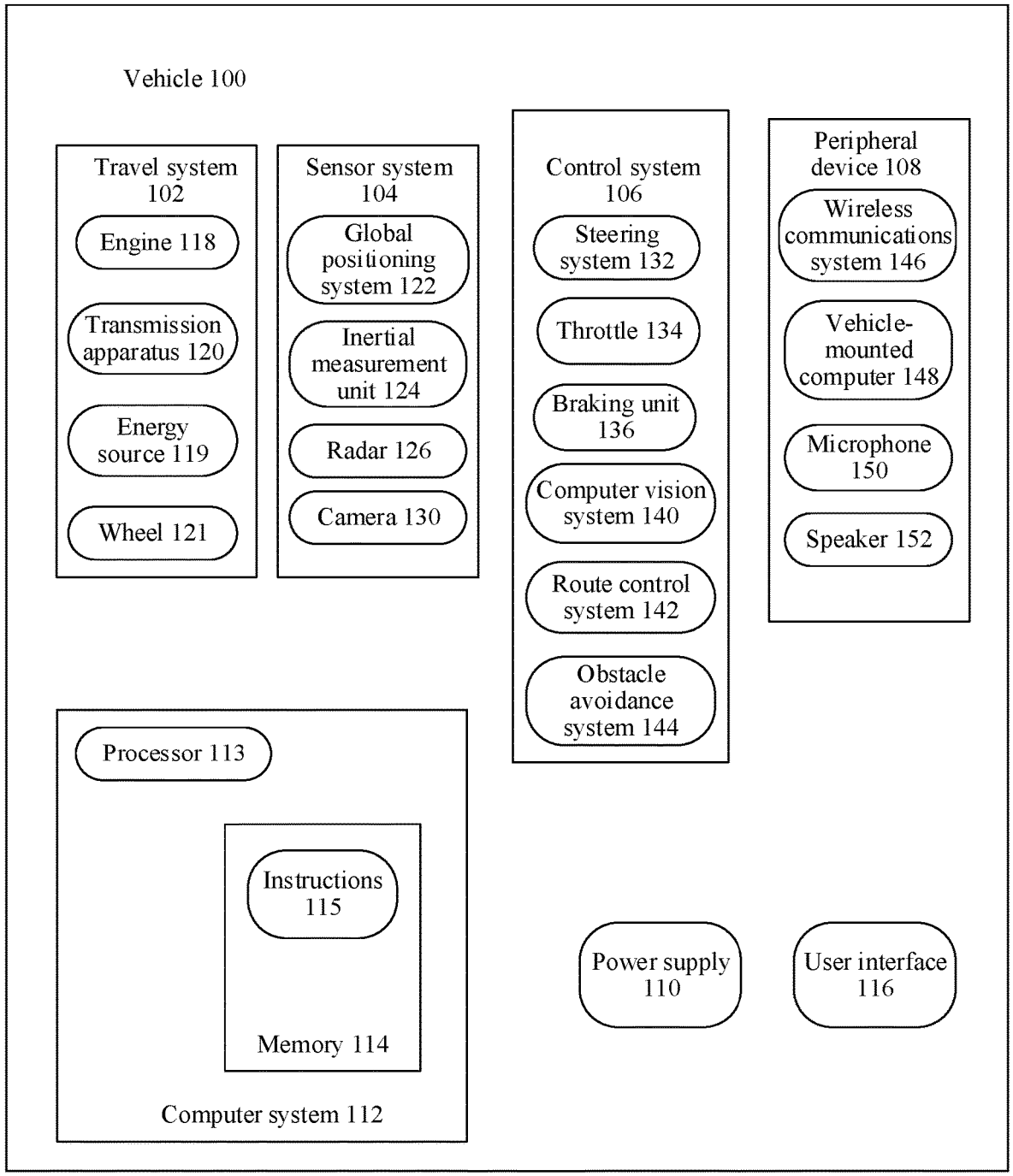
FIG. 1 is a schematic diagram of a structure of an autonomous vehicle according to an embodiment of this application.

FIG. 1 is a schematic diagram of a structure of an autonomous vehicle according to an embodiment of this application. A radar in this embodiment of this application may be a radar 126 in FIG. 1, and the radar 126 may be a laser radar, a laser range finder, or a millimeter-wave radar. Optionally, a function of a processing unit 210 in a radar 200 in FIG. 2 may be implemented by a processor 113 in FIG. 1, or may be implemented by another type of processing chip, such as a field programmable gate array (field programmable gate array, FPGA) or an application-specific integrated circuit (application specific integrated circuit, ASIC).

As shown in FIG. 1, in an embodiment, a vehicle 100 is configured in a fully or partially autonomous driving mode. For example, the vehicle 100 in the automatic driving mode may control the vehicle 100. A manual operation may be performed to determine current statuses of the vehicle and an ambient environment of the vehicle, determine possible behavior of at least one another vehicle in the ambient environment, determine a confidence level corresponding to a possibility that the another vehicle performs the possible behavior, and control the vehicle 100 based on determined information. When the vehicle 100 is in the autonomous driving mode, the vehicle 100 may be set to operate without interacting with a person.

The vehicle 100 may include various subsystems, for example, a travel system 102, a sensor system 104, a control system 106, one or more peripheral devices 108, a power supply 110, a computer system 112, and a user interface 116. Optionally, the vehicle 100 may include more or fewer subsystems, and each subsystem may include a plurality of elements. In addition, each subsystem and element of the vehicle 100 may be interconnected in a wired or wireless manner.

The travel system 102 may include a component providing power motion to the vehicle 100. In an embodiment, the travel system 102 may include an engine 118, an energy source 119, a transmission apparatus 120, and wheels/tires 121. The engine 118 may be a combination of an internal combustion engine, an electric motor, an air compression engine, or another type of engine, for example, a hybrid engine including a gasoline engine and an electric motor, or a hybrid engine including an internal combustion engine and an air compression engine. The engine 118 converts the energy source 119 into mechanical energy.

Examples of the energy source 119 include gasoline, diesel, another petroleum-based fuel, propane, another compressed gas-based fuel, ethanol, a solar panel, a battery, and another power source. The energy source 119 may also provide energy to another system of the vehicle 100.

The transmission apparatus 120 may transmit mechanical power from the engine 118 to the wheel 121. The transmission apparatus 120 may include a gearbox, a differential, and a drive shaft. In an embodiment, the transmission apparatus 120 may further include another component, for example, a clutch. The drive shaft may include one or more shafts that may be coupled to one or more wheels 121.

The sensor system 104 may include several sensors that sense information about the ambient environment of the vehicle 100. For example, the sensor system 104 may include a positioning system 122 (where the positioning system may be a global positioning system (global positioning system, GPS), a BeiDou system or another positioning system), an inertial measurement unit (inertial measurement unit, IMU) 124, the radar 126, and a camera 130. The sensor system 104 may further include a sensor (for example, an in-vehicle air quality monitor, a fuel gauge, or an engine oil thermometer) of an internal system of the monitored vehicle 100. One or more pieces of sensor data from these sensors can be used to detect an object and a corresponding feature (a location, a shape, a direction, a speed, or the like) of the object. Such detection and recognition are key functions of a safe operation of the autonomous vehicle 100.

The positioning system 122 may be configured to estimate a geographic location of the vehicle 100. The IMU 124 is configured to sense location and orientation changes of the vehicle 100 based on an inertial acceleration. In an embodiment, the IMU 124 may be a combination of an accelerometer and a gyroscope.

The radar 126 may sense an object in an ambient environment of the vehicle 100 by using a radio signal, an optical signal, or a laser signal. In some embodiments, in addition to sensing the object, the radar 126 may further be configured to sense a speed and/or an advancing direction of the object. In some embodiments, if the radar 126 is a laser range finder, the radar 126 may include one or more laser sources, a laser scanner, one or more detectors, and another system component.

The camera 130 may be configured to capture a plurality of images of the ambient environment of the vehicle 100. The camera 130 may be a static camera or a video camera.

The control system 106 controls operations of the vehicle 100 and components of the vehicle 100. The control system 106 may include various elements, including a steering system 132, a throttle 134, a braking unit 136, a sensor fusion algorithm 138, a computer vision system 140, a route control system 142, and an obstacle avoidance system 144.

The steering system 132 is operable to adjust an advancing direction of the vehicle 100. For example, in an embodiment, the steering system 132 may be a steering wheel system.

The throttle 134 is configured to: control an operating speed of the engine 118 and further control a speed of the vehicle 100.

The braking unit 136 is configured to control the vehicle 100 to decelerate. The braking unit 136 may use friction to slow down the wheel 121. In another embodiment, the braking unit 136 may convert kinetic energy of the wheel 121 into an electric current. Alternatively, the braking unit 136 may reduce a rotational speed of the wheel 121 in another form to control the speed of the vehicle 100.

The computer vision system 140 is operable to process and analyze the image captured by the camera 130, to recognize the object and/or a feature in the ambient environment of the vehicle 100. The object and/or the feature may include a traffic signal, a road boundary, and an obstacle. The computer vision system 140 may use an object recognition algorithm, a structure from motion (structure from motion, SFM) algorithm, video tracking, and another computer vision technology. In some embodiments, the computer vision system 140 may be configured to draw a map for an environment, track an object, estimate a speed of an object, and the like.

The route control system 142 is configured to determine a running route of the vehicle 100. In some embodiments, the route control system 142 may determine the running route of the vehicle 100 with reference to data from the sensor fusion algorithm 138, the GPS 122, and one or more predetermined maps.

The obstacle avoidance system 144 is configured to recognize, evaluate, and avoid or bypass, in another manner, a potential obstacle in an environment of the vehicle 100.

Certainly, in an example, the control system 106 may additionally or alternatively include a component other than those shown and described. Alternatively, some of the components shown above may be reduced.

The vehicle 100 interacts with an external sensor, another vehicle, another computer system, or a user by using the peripheral device 108. The peripheral device 108 may include a wireless communications system 146, a vehicle-mounted computer 148, a microphone 150, and/or a speaker 152.

In some embodiments, the peripheral device 108 provides a means for a user of the vehicle 100 to interact with the user interface 116. For example, the vehicle-mounted computer 148 may provide information to the user of the vehicle 100. The user interface 116 may further receive a user input by operating the vehicle-mounted computer 148. The vehicle-mounted computer 148 may be operated by using a touchscreen. In another case, the peripheral device 108 may provide a means for the vehicle 100 to communicate with another device located in the vehicle. For example, the microphone 150 may receive audio (for example, a voice command or another audio input) from the user of the vehicle 100. Similarly, the speaker 152 may output audio to the user of the vehicle 100.

The wireless communications system 146 may perform wireless communication with one or more devices directly or through a communications network. For example, the wireless communications system 146 may use 4G cellular communication, such as a long term evolution (long term evolution, LTE) system, an LTE frequency division duplex (frequency division duplex, FDD) system, a universal mobile telecommunications system (universal mobile telecommunication system, UMTS) system, and a worldwide interoperability for microwave access (worldwide interoperability for microwave access, WiMAX) communications system. Alternatively, the wireless communications system 146 may use 5G cellular communication, such as a future 5th generation (5th generation, 5G) system or a new radio (new radio, NR) system. The wireless communications system 146 may communicate with a wireless local area network (wireless local area network, WLAN) by using Wi-Fi. In some embodiments, the wireless communications system 146 may communicate directly with a device through an infrared link or by using Bluetooth or ZigBee (ZigBee). Other wireless protocols, for example, various vehicle communications systems, such as the wireless communications system 146, may include one or more dedicated short range communications (DSRC) devices, and these devices may include public and/or private data communication between the vehicle and/or roadside stations.

The power supply 110 may provide power to various components of the vehicle 100. In an embodiment, the power supply 110 may be a rechargeable lithium-ion or lead-acid battery. One or more battery packs of the battery may be configured to provide power to the various components of the vehicle 100. In some embodiments, the power supply 110 and the energy source 119 may be implemented together, as in some battery electric vehicles.

Some or all of functions of the vehicle 100 are controlled by the computer system 112. The computer system 112 may include at least one processor 113. The processor 113 executes instructions 115 stored in a non-transitory computer-readable medium such as a memory 114. The computer system 112 may alternatively be a plurality of computing devices that control an individual component or the subsystem of the vehicle 100 in a distributed manner.

The processor 113 may be any conventional processor, for example, a commercially available CPU. Alternatively, the processor may be a dedicated device such as an ASIC or another hardware-based processor. Although FIG. 1 functionally illustrates the processor, the memory, and another element of a computer system 112 in a same block, a person of ordinary skill in the art should understand that the processor, the computer, or the memory may actually include a plurality of processors, computers, or memories that may or may not be stored in a same physical housing. For example, the memory may be a hard disk drive, or another storage medium that is located in a housing different from that of the computer system 112. Therefore, it is understood that a reference to the processor or the computer includes a reference to a set of processors or computers or memories that may or may not operate in parallel. Different from using a single processor to perform the steps described herein, some components, such as a steering component and a deceleration component, each may have its own processor that performs only calculation related to a component-specific function.

In various aspects described herein, the processor may be located far away from the vehicle and perform wireless communication with the vehicle. In another aspect, some of processes described herein are performed on a processor disposed inside the vehicle, while others are performed by a remote processor. The processes include necessary steps for performing a single operation.

In some embodiments, the memory 114 may include the instruction 115 (for example, program logic), and the instructions 115 may be executed by the processor 113 to perform various functions of the vehicle 100, including the functions described above. The memory 114 may also include additional instructions, including instructions used to send data to, receive data from, interact with, and/or control one or more of the travel system 102, the sensor system 104, the control system 106, and the peripheral device 108.

In addition to the instruction 115, the memory 114 may further store data, such as a road map, route information, and a location, a direction, a speed, and other such vehicle data of the vehicle, and other information. Such information may be used by the vehicle 100 and the computer system 112 when the vehicle 100 operates in an autonomous mode, a semi-autonomous mode, and/or a manual mode.

The user interface 116 is configured to provide information to or receive information from the user of the vehicle 100. Optionally, the user interface 116 may include one or more input/output devices in a set of peripheral devices 108, for example, the wireless communications system 146, the vehicle-mounted computer 148, the microphone 150, and the speaker 152.

The computer system 112 may control the functions of the vehicle 100 based on inputs received from the various subsystems (for example, the travel system 102, the sensor system 104, and the control system 106) and from the user interface 116. For example, the computer system 112 may use an input from the control system 106 to control the steering unit 132 to avoid an obstacle detected by the sensor system 104 and the obstacle avoidance system 144. In some embodiments, the computer system 112 is operable to provide control over many aspects of the vehicle 100 and the subsystems of the vehicle 100.

Optionally, one or more of the foregoing components may be installed separately from or associated with the vehicle 100. For example, the memory 114 may be partially or completely separated from the vehicle 100. The components may be communicatively coupled together in a wired and/or wireless manner.

Optionally, the foregoing components are merely examples. In actual application, components in the foregoing modules may be added or removed based on an actual requirement. FIG. 1 should not be construed as a limitation on this embodiment of the present invention.

An autonomous vehicle traveling on a road, for example, the vehicle 100, may recognize an object in an ambient environment of the autonomous vehicle, to determine to adjust a current speed. The object may be another vehicle, a traffic control device, or another type of object. In some examples, each recognized object may be considered independently, and based on features of each object, such as a current speed of the object, an acceleration of the object, and a spacing between the object and the vehicle, may be used to determine the speed to be adjusted by the automatic driving vehicle.

Optionally, the autonomous vehicle 100 or a computing device (for example, the computer system 112, the computer vision system 140, or the memory 114 in FIG. 1) associated with the autonomous vehicle 100 may predict behavior of the recognized object based on the feature of the recognized object and a status (for example, traffic, rain, or ice on a road) of the ambient environment. Optionally, the recognized objects depend on the behavior of each other. Therefore, the behavior of a single recognized object may alternatively be predicted by considering all the recognized objects together. The vehicle 100 can adjust the speed of the vehicle 100 based on the predicted behavior of the recognized object. In other words, the autonomous vehicle can determine, based on the predicted behavior of the article, a stable state to which the vehicle needs to be adjusted (for example, speeding up, deceleration, or stop). In this process, another factor, for example, a transverse location of the vehicle 100 on a road on which the vehicle 100 runs, a curvature of the road, or proximity between static and dynamic objects may also be considered, to determine the speed of the vehicle 100.

The vehicle 100 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not specifically limited in this embodiment of the present invention.

Figure 2:
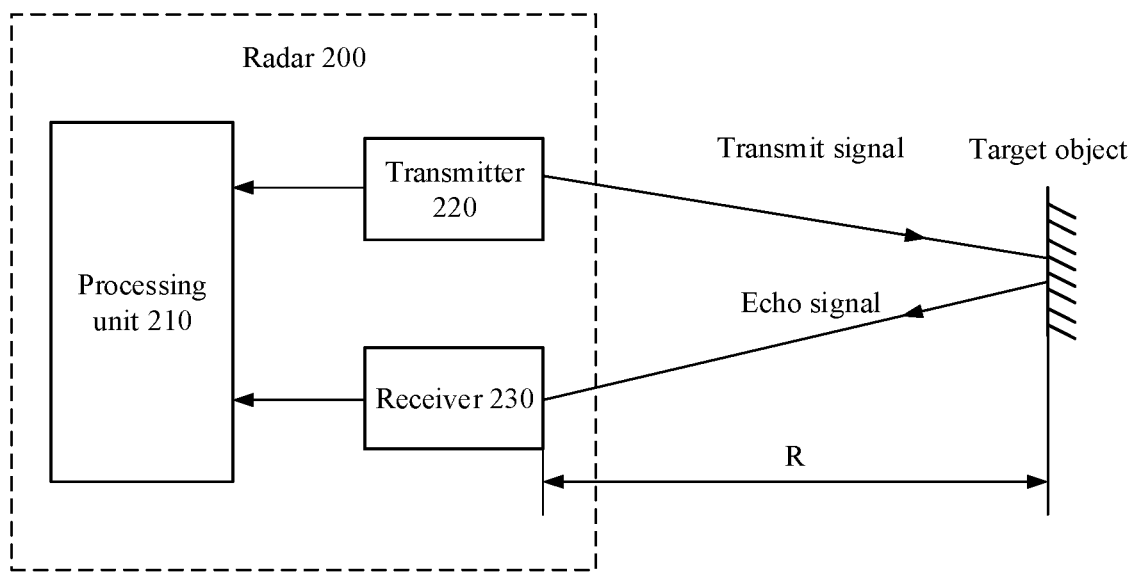
FIG. 2 is a schematic diagram of a radar 200.

FIG. 2 is a schematic diagram of a structure of the radar 200. The radar in this embodiment of this application may include a laser radar, a laser range finder, a millimeter-wave radar, or another type of radar. As shown in FIG. 2, the radar 200 includes a transmitter 220, a receiver 230, and a processing unit 210. Optionally, the processing unit 210 may include a central processing unit (central processor unit, CPU), an FPGA, or an ASIC, or may be another type of processing chip. In a ranging process, the transmitter 220 sends a transmit signal to a target object, and the transmit signal is a pulse signal. The target object reflects the transmit signal, and the receiver 230 receives an echo signal reflected by the target object. In this embodiment of this application, the transmit signal may also be referred to as a transmit signal waveform, a transmit pulse, a transmit pulse signal, or the like, and the echo signal may also be referred to as an echo signal waveform, a receive pulse, a receive pulse signal, or the like.

A moment at which the transmitter 220 sends the transmit signal may be referred to as a transmit moment, and a moment at which the receiver 230 receives the echo signal may be referred to as a receive moment. The processing unit 210 may determine time of flight based on the transmit moment and the receive moment. Further, the processing unit 210 calculates a distance R between the radar and the target object based on a light speed and the time of flight. The distance R may be calculated according to the following formula (1):

$$R = c*T/2 \qquad (1)$$

R represents the distance between the radar and the target object, c represents the light speed, and T represents the time of flight.

Figure 4:
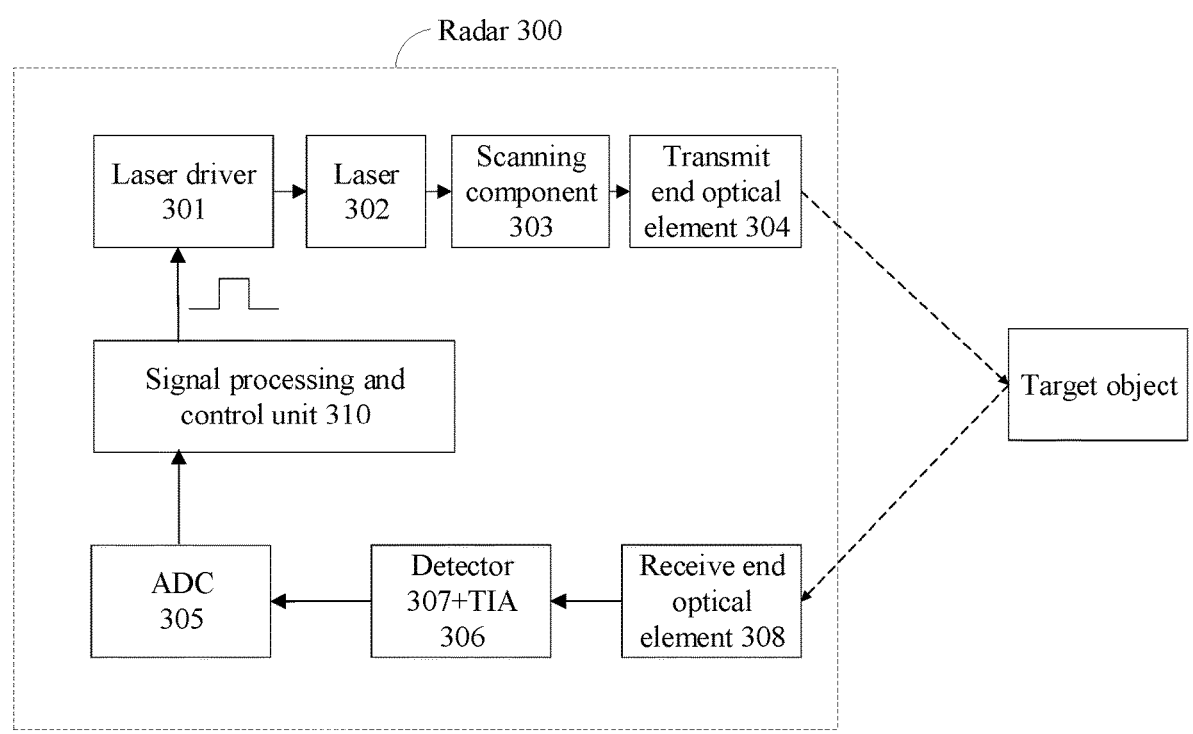
FIG. 4 is a schematic diagram of a framework of a radar 300 according to an embodiment of this application.

FIG. 4 is a schematic diagram of a framework of a radar 300 according to an embodiment of this application. In FIG. 4, a structure of the radar is described by using a laser radar as an example. The processing unit 210 of the radar 200 in FIG. 2 may include a signal processing and control unit 310 in FIG. 4. The transmitter 220 may include a laser driver 301, a laser 302, a scanning component 303, and a transmit end optical element 304. The receiver 230 may include an analog-to-digital converter (analog-to-digital converter, ADC) 305, a transistor impedance amplifier (transistor impedance amplifier, TIA) 306, a detector 307, and a receive end optical element 308.

In a process of sending a signal, the signal processing and control unit 310 sends a pulse signal of the signal to the laser driver 301, and the laser driver 301 modulates the pulse signal, and outputs the modulated pulse signal to the laser 302. The laser 302 sends an optical signal with a pulse to the scanning component 303. The scanning component 303 and the transmit end optical element 304 scan and shape a beam, and then sends the pulse signal to a target object.

In a process of receiving an echo signal, after focusing and shaping the received echo signal, the receive end optical element 308 sends the echo signal to the detector 307. The echo signal is an optical signal, and after receiving the echo signal, the detector 307 performs photoelectric conversion to obtain a current signal. The TIA 306 converts the current signal into a voltage signal and sends the voltage signal to the ADC 305. The ADC 305 performs analog-to-digital conversion on an analog voltage signal to obtain a digital signal. The signal processing and control unit 310 obtains a signal processed by the ADC 305, and calculates a distance between the radar and the target object based on the obtained signal.

It should be noted that in FIG. 4, only the laser radar is used as an example to describe a working principle of the radar, but this is not limited. A person skilled in the art can understand that the radar in this application may further be another type of radar, such as a laser range finder or a millimeter-wave radar. The radar may further include more or fewer functional units or components, provided that the radar can perform the method in the embodiments of this application.

Figure 5:
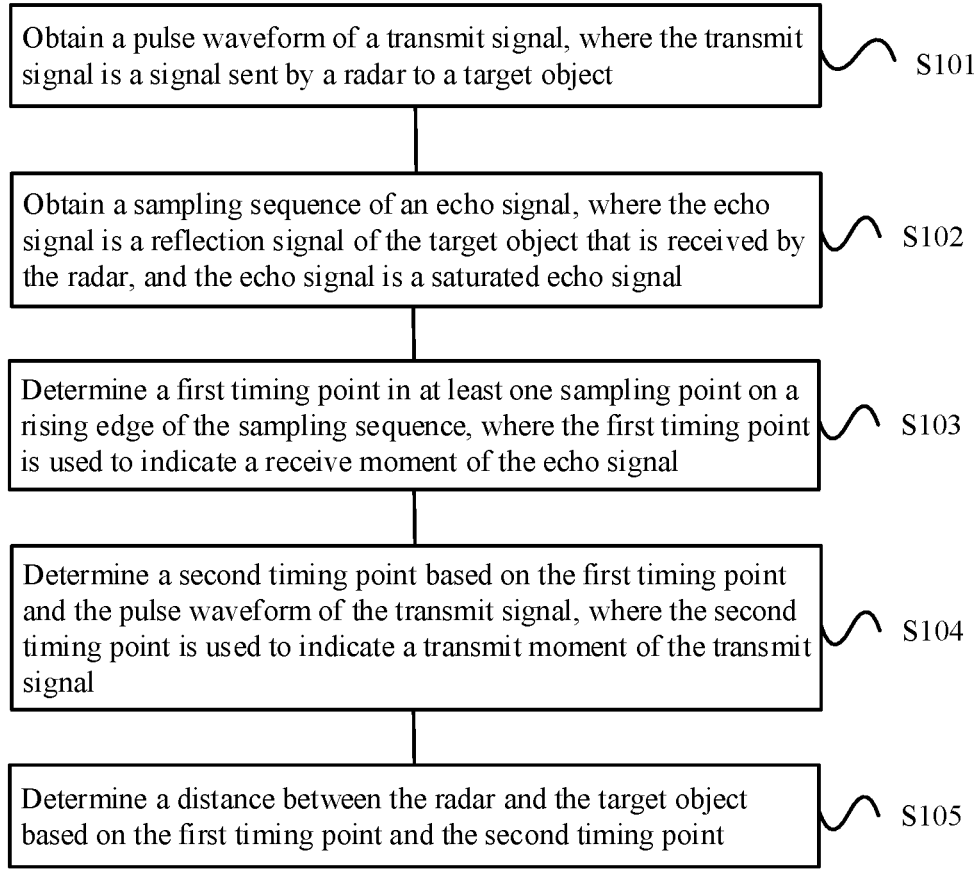
FIG. 5 is a schematic flowchart of a radar ranging method according to an embodiment of this application.

FIG. 5 is a schematic flowchart of a radar ranging method according to an embodiment of this application. The method may be performed by a radar, for example, the method may be performed by the processing unit 210 in FIG. 2, or may be performed by the signal processing and control unit 310 in FIG. 4. As shown in FIG. 5, the method includes the following steps.

S101: Obtain a pulse waveform of a transmit signal, where the transmit signal is a signal sent by a radar to a target object.

Optionally, the radar may include a laser radar, a laser range finder, a millimeter-wave radar, or another type of radar. The transmit signal may be an optical signal, a laser signal, or an electromagnetic wave signal.

Optionally, the pulse waveform of the transmit signal may be obtained in a plurality of manners. In one manner, after a signal sent by the radar to the target object is split, the pulse waveform of the transmit signal is obtained through an optical fiber reference optical path. In another manner, a pulse signal of a reference signal may be obtained through calibration before delivery of a product, and then the pulse waveform of the transmit signal is obtained in combination with a trigger moment of the transmit signal. The reference signal may be an ideal waveform signal of the transmit signal. In this embodiment of this application, a pulse waveform obtained through calibration before delivery may be referred to as a reference signal.

For example, when the radar sends a signal, a transmitted optical signal may be divided into two parts. Most of the signal (for example, 99% of energy of the optical signal) is sent to the target object through a transmitter, and a small part of the signal (for example, 1% of energy of the optical signal) is returned through an optical fiber reference optical path with a fixed delay. A signal collected from an optical fiber may be referred to as a split signal. The processing unit in the radar may perform translation processing on a pulse waveform of the split signal based on fixed delay duration, to obtain the pulse waveform of the transmit signal.

For another example, a storage device in the radar may prestore the pulse waveform of the reference signal. When the transmitter in the radar sends the transmit signal, the processing unit in the radar may obtain the pulse waveform of the reference signal from the storage device, and obtain the pulse waveform of the transmit signal in combination with the trigger moment of the transmit signal.

As a specific example, the pulse waveform of the reference signal may be obtained through a plurality of times of manual measurement in a system test phase of the radar. For example, in the system test phase, a reflector with a known reflectivity and distance is set. The transmitter of the radar is used to send the transmit signal to the reflector, and receive an echo signal reflected by the reflector. After the signal reflected by the reflector is measured and calibrated for a plurality of times, a near ideal signal waveform can be obtained. The signal waveform may be stored as the pulse waveform of the reference signal in the storage unit of the radar for subsequent comparison.

S102: Obtain a sampling sequence of an echo signal, where the echo signal is a reflection signal of the target object that is received by the radar, and the echo signal is a saturated echo signal.

In this embodiment of this application, a sampling sequence obtained by sampling the saturated echo signal may be referred to as a sampling sequence or a saturated sampling sequence of the saturated echo signal.

Figure 3A:
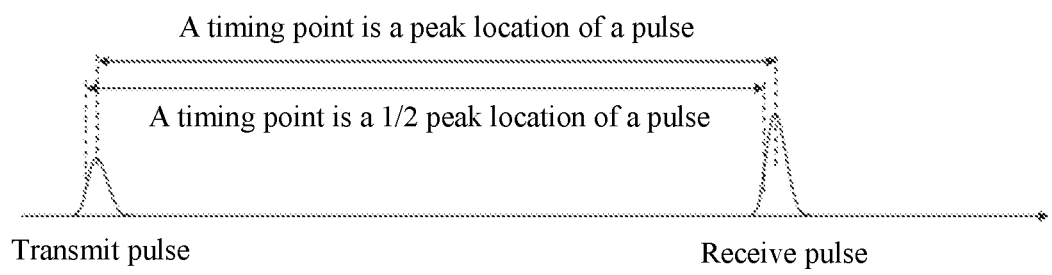
FIG. 3(a) and FIG. 3(b) are schematic diagrams of transmit pulses and receive pulses.
Figure 3B:
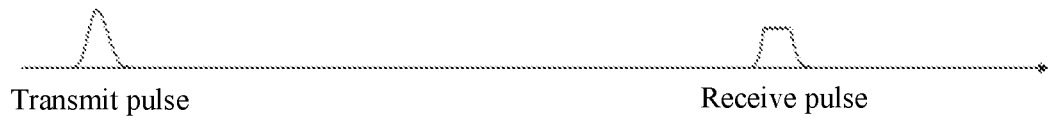

For example, a receiver in the radar may receive an echo signal reflected by the target object, and the echo signal is a saturated echo signal. A waveform of the saturated echo signal may be shown in FIG. 3(*b*). The radar may perform a series of processing on the saturated echo signal, for example, photoelectric conversion, transistor impedance amplification, analog-to-digital conversion, to obtain a saturated sampling sequence obtained through sampling.

Figure 6:
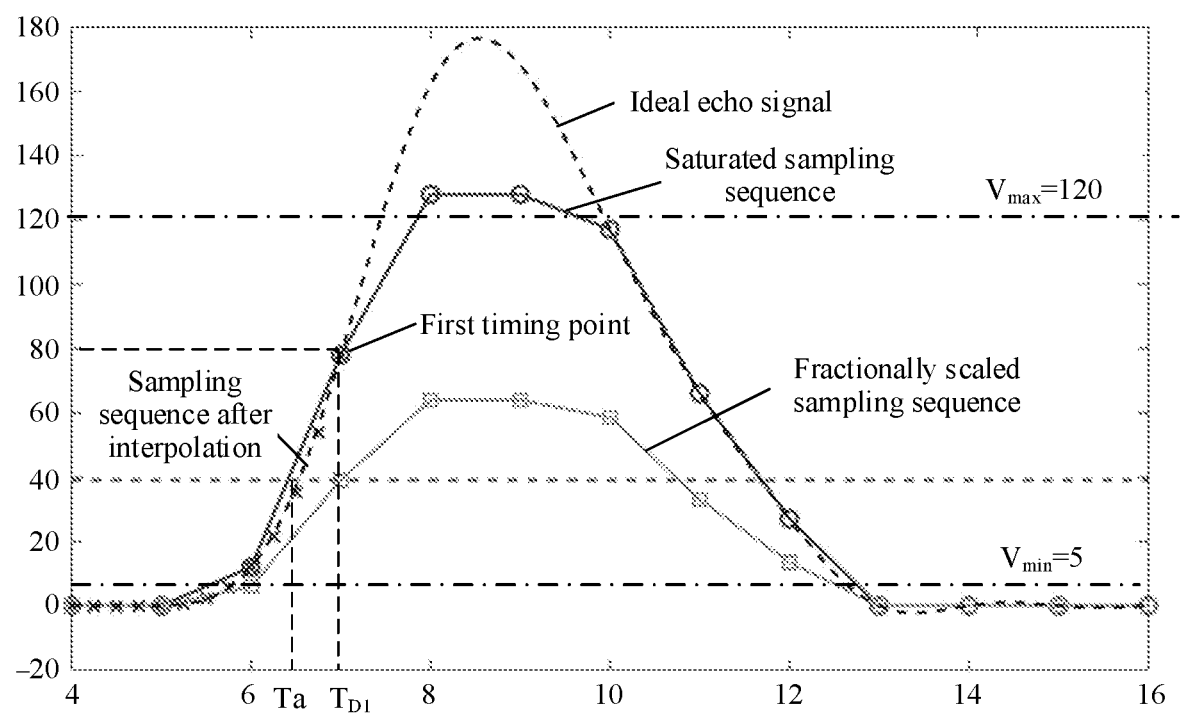
FIG. 6 is a schematic diagram of a saturated sampling sequence according to an embodiment of this application.

For example, FIG. 6 is a schematic diagram of a saturated sampling sequence according to an embodiment of this application. In FIG. 6, a horizontal axis represents time, and a vertical axis represents an amplitude of a signal. A curve with a circle mark represents a saturated sampling sequence of an echo signal, and the circle mark represents a sampling point. A dashed line represents a waveform of an ideal echo signal.

S103: Determine a first timing point in at least one sampling point on a rising edge of the sampling sequence, where the first timing point is used to indicate a receive moment of the echo signal.

In this embodiment of this application, a timing point that indicates a receive moment may be first selected from the saturated sampling sequence of the echo signal, and then a timing point that indicates a transmit moment is further determined based on the timing point. For ease of differentiation, the timing point that indicates the receive moment of the echo signal may be referred to as a first timing point, and the timing point that indicates the transmit moment of the transmit signal may be referred to as a second timing point.

The saturated sampling sequence includes a rising edge and a falling edge. In principle, any sampling point may be selected from sampling points on the rising edge or the falling edge of the saturated sampling sequence as the first timing point. However, there is a phenomenon of broadening of the falling edge of the saturated echo signal, and a deformation ratio of the falling edge of the saturated sampling sequence is more severe than that of the rising edge. Therefore, to determine time of flight more precisely, the first timing point is usually selected from sampling points on the rising edge of the saturated sampling sequence.

For the saturated sampling sequence, a saturation threshold $V_{max}$ and a minimum amplitude threshold $V_{min}$ are further defined. A sampling point that reaches the saturation threshold $V_{max}$ on the saturation sampling sequence is referred to as a saturated sampling point. A sampling point between the saturation threshold $V_{max}$ and the minimum amplitude threshold $V_{min}$ is referred to as an unsaturated sampling point.

For example, if a maximum dynamic range of a receiver for a receive signal is represented as $[V_L, V_H]$, the saturation threshold $V_{max}$ and the minimum amplitude threshold $V_{min}$ may be determined in the following calculation manner:

$$V_{max}=V_L+0.99\times(V_H-V_L); \text{ and } V_{min}=V_L+0.01\times(V_H-V_L).$$

$V_L$ represents a lower limit of the dynamic range of the receiver for the receive signal, and $V_H$ represents an upper limit of the dynamic range of the receiver for the receive signal. Factors 0.99 and 0.01 are merely examples. According to specific practice, other real numbers in the range [0, 1] may also be selected as the factors.

In this embodiment of this application, the rising edge of the saturated sampling sequence may include an unsaturated sampling point, or may include the first saturated sampling point of the saturated sampling sequence.

In some examples, if the rising edge of the sampling sequence includes a plurality of unsaturated sampling points, one sampling point may be randomly selected from the plurality of unsaturated sampling points as the first timing point.

In some examples, if the rising edge of the sampling sequence includes a plurality of unsaturated sampling points, the last unsaturated sampling point on the rising edge of the sampling sequence may be selected as the first timing point. Because the saturated echo signal is a signal on which echo signal clipping occurs, and an amplitude of the signal is lower than a normal amplitude, the last unsaturated sampling point on the rising edge may be selected as the first timing point. That is, an amplitude of the first timing point is as high as possible, so that the time of flight obtained through calculation is more precise.

In some examples, if the rising edge of the sampling sequence includes only one unsaturated sampling point, the unsaturated sampling point may be selected as the first timing point.

In some examples, if the rising edge of the sampling sequence does not include an unsaturated sampling point, the first saturated sampling point on the rising edge may be selected as the first timing point.

In this application, an appropriate timing point may be flexibly and dynamically selected on the rising edge of the saturated sampling sequence based on different degrees of saturation severity of the received saturated sampling sequence, to improve precision of determining time of flight, and further improve radar ranging precision.

S104: Determine a second timing point based on the first timing point and the pulse waveform of the transmit signal, where the second timing point is used to indicate the transmit moment of the transmit signal.

Optionally, if the saturation degree of the echo signal is relatively light, for example, the rising edge of the saturated sampling sequence includes a plurality of unsaturated sampling points, the second timing point may be determined in the first manner.

In the first manner, a fractional scale factor a may be first preset, and a delay factor $\Delta T$ is determined based on the fractional scale factor a and the first timing point. Then, the second timing point is determined based on the fractional scale factor a, the delay factor $\Delta T$, and the pulse waveform of the transmit signal, where $0<a<1$.

Figure 7:
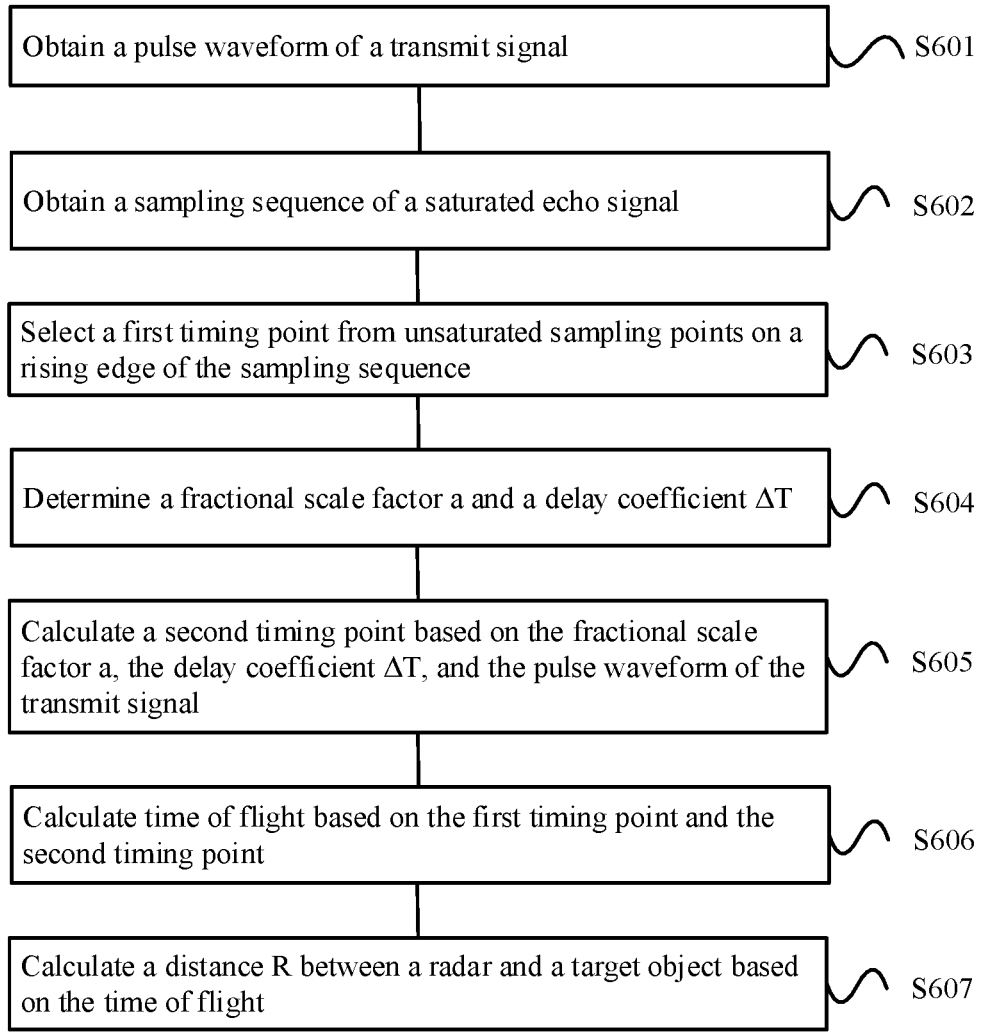
FIG. 7 is a schematic flowchart of a radar ranging method according to another embodiment of this application.
Figure 8:
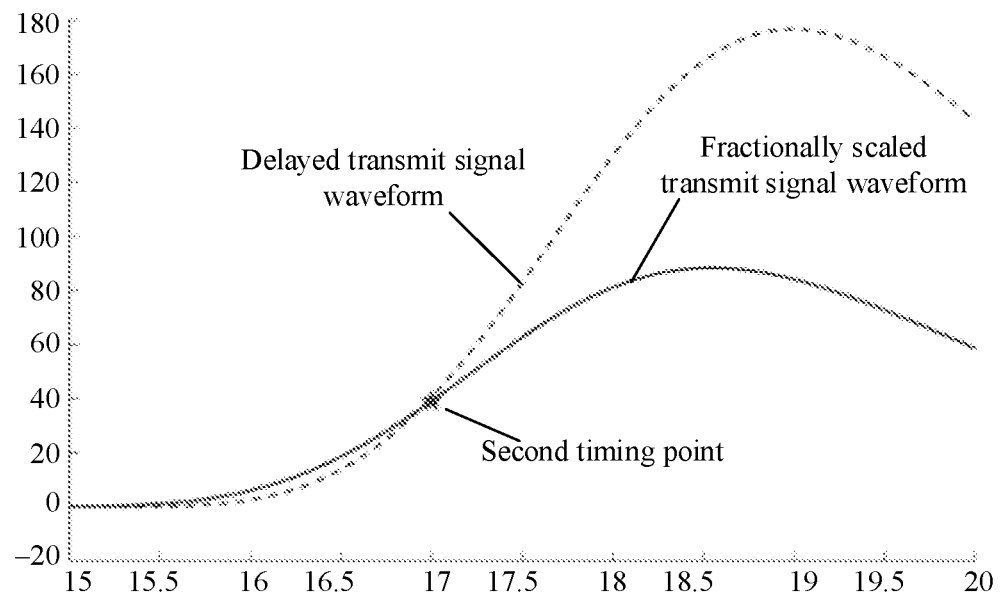
FIG. 8 is a schematic diagram of a waveform of a transmit signal according to an embodiment of this application.

Specifically, the manner includes: fractionally scaling an amplitude of the sampling sequence based on the fractional scale factor a, to obtain a fractionally scaled sampling sequence, where $0<a<1$; determining a moment Ta at which the fractionally scaled sampling sequence reaches $a\times V_{TD1}$, where $V_{TD1}$ represents an amplitude of the first timing point on the saturated sampling sequence; determining the delay factor $\Delta T$, where $\Delta T=T_{D1}-Ta$, and $T_{D1}$ represents a moment of the first timing point; and calculating the second timing point based on the fractional scale factor a, the delay factor $\Delta T$, and the pulse waveform of the transmit signal. Specifically, the pulse waveform of the transmit signal may be separately fractionally scaled and delayed based on the fractional scale factor a and the delay factor $\Delta T$, to obtain a fractionally scaled pulse waveform and a delayed pulse waveform, and an intersection point of the two pulse waveforms is used as the second timing point. With reference to FIG. 7 and FIG. 8, the following continues to describe the first manner of determining the timing point.

Optionally, if the saturation degree of the echo signal is relatively severe, for example, the rising edge of the saturated sampling sequence includes only one unsaturated sampling point, or even does not include an unsaturated sampling point, the second timing point may be determined in the second manner.

Figure 11:
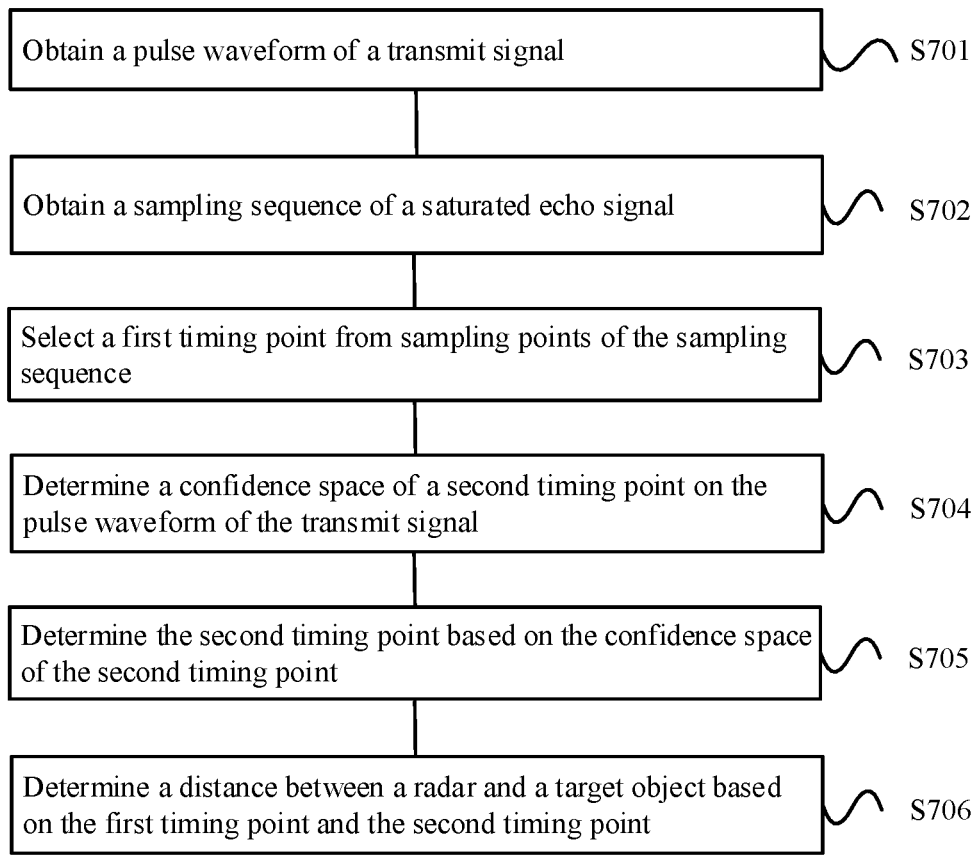
FIG. 11 is a schematic diagram of a radar ranging method according to another embodiment of this application.
Figure 12:
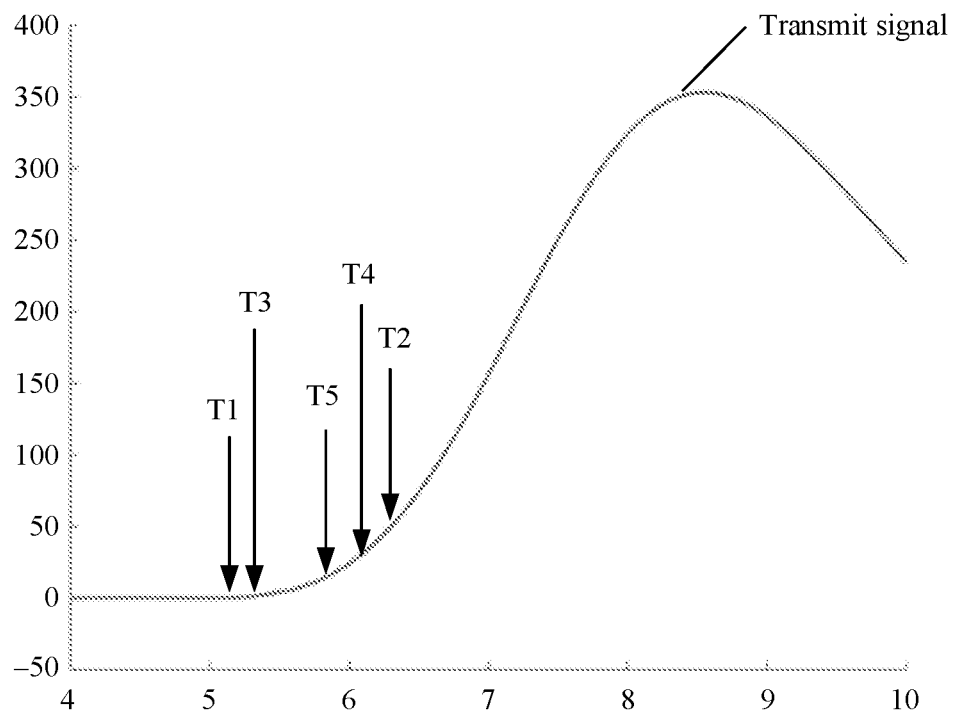
FIG. 12 is a schematic diagram of a confidence interval of a second timing point according to an embodiment of this application.

In the second manner, a confidence interval of the second timing point on the transmit signal waveform may be determined based on the first timing point. Specifically, the manner includes: determining the confidence interval of the second timing point on the pulse waveform of the transmit signal based on the first timing point; and determining the second timing point based on the confidence interval of the second timing point. For example, the confidence space of the second timing point may be determined based on a boundary condition. With reference to FIG. 11 and FIG. 12, the following continues to describe the second manner of determining the timing point.

It should be noted that the second timing point may be located on the pulse waveform of the transmit signal, or may not be located on the pulse waveform of the transmit signal. For example, in the first manner of determining the second timing point, the second timing point is the intersection point between the fractionally scaled transmit signal and the delayed transmit signal, that is, the second timing point is located on a pulse waveform of the fractionally scaled transmit signal or is located on a waveform of the delayed transmit signal. In the second manner of determining the second timing point, the second timing point is located on the pulse waveform of the transmit signal.

S105: Determine a distance between the radar and the target object based on the first timing point and the second timing point.

Optionally, after a moment $T_{D1}$ of the first timing point and a moment $T_{D2}$ of the second timing point are determined, it may be determined that the time of flight is $T=T_{D1}-T_{D2}$, and the distance R between the radar and the target object may be determined according to the following formula (2):

$$R=(T_{D1}-T_{D2})\times c/2 \qquad (2)$$

$T_{D1}$ represents the moment of the first timing point, $T_{D2}$ represents the moment of the second timing point, and c represents a light speed.

In this embodiment of this application, in a radar ranging process, after the sampling sequence of the saturated echo signal is obtained, the first timing point may be selected from the at least one sampling point on the rising edge of the sampling sequence, and the first timing point is used as the receive moment of the echo signal. Then, the second timing point is determined based on the first timing point and the waveform of the transmit signal, and the second timing point is used as the transmit moment of the transmit signal. Because the first timing point is selected from the sampling points on the rising edge of the saturated sampling sequence, moment information and amplitude information that correspond to the first timing point are true information on the echo signal. In addition, in the foregoing solution, a location of the first timing point is first determined, and then a location of the second timing point is determined based on the location of the first timing point. In this manner, the timing point is determined based on the true information of the echo signal as much as possible, so that precision of determining time of flight can be improved when the saturated echo signal is received, thereby further improving radar ranging precision. If a preset timing point is a fixed location on the saturated echo signal and the transmit signal, a location of a non-sampling point on the saturated sampling sequence may be selected as the timing point. This makes moment information and amplitude information of the timing point not precise, thereby reducing radar ranging precision.

FIG. 7 is a schematic flowchart of a radar ranging method according to another embodiment of this application. FIG. 7 shows a method for determining a timing point based on a fractional scale factor a and a delay factor ΔT. The method in FIG. 7 is applicable to a scenario in which a saturation degree of an echo signal is relatively light, for example, a case in which a rising edge of a saturated sampling sequence includes a plurality of unsaturated sampling points. As shown in FIG. 7, the method includes the following steps.

S601: Obtain a pulse waveform of a transmit signal.

For example, a storage device in a radar may prestore a pulse waveform of a reference signal. A processing unit in the radar may obtain the pulse waveform of the reference signal from the storage device, and obtain the pulse waveform of the transmit signal in combination with a trigger moment of the transmit signal. Alternatively, after a signal sent by the radar to a target object is split, a small part of the signal that is split is returned to the radar through a reference optical path with a fixed delay, and the part of the signal is a split signal. The radar may translate a waveform of the split signal based on the fixed delay to obtain the pulse waveform of the transmit signal.

S602: Obtain a sampling sequence of a saturated echo signal.

For example, the sampling sequence is a sampling sequence after ADC sampling.

Content of S601 and S602 is the same as or similar to content of S101 or S102 in FIG. 5. For brevity, details are not described herein again.

S603: Select a first timing point from unsaturated sampling points on a rising edge of the sampling sequence.

For example, a first sampling point that is the first sampling point, on the rising edge, greater than a minimum amplitude threshold $V_{min}$ is first determined, and then a second sampling point that is the last sampling point, on the rising edge, less than a saturation threshold $V_{max}$ is determined. The first sampling point, the second sampling point, and a sampling point located between the first sampling point and the second sampling point are unsaturated sampling points located on the rising edge of the sampling sequence. A sampling point may be randomly selected from the unsaturated sampling points on the rising edge as the first timing point.

As shown in FIG. 6, assuming $V_{min}=5$ and $V_{max}=120$, the unsaturated sampling points on the rising edge are two sampling points at a moment 6 and a moment 7. The sampling point located at the moment 7 may be selected as the first timing point, and the moment of the first timing point is recorded as $T_{D1}=7$. In this case, an amplitude corresponding to the first timing point is $V_{TD1}=80$.

S604: Determine a fractional scale factor a and a delay factor ΔT.

Specifically, the fractional scale factor a may be first determined, and an original sampling sequence is fractionally scaled based on the fractional scale factor a, to calculate an amplitude of the first timing point on the fractionally scaled saturated sampling sequence, that is, $a\times V_{TD1}$. Then, a moment at which the rising edge of the original sampling sequence signal reaches $a\times V_{TD1}$ is calculated, and the moment is recorded as Ta. In this way, the delay factor ΔT is expressed as $\Delta T=T_{D1}-Ta$.

Any value between 0 and 1 may be selected for the fractional scale factor a. For example, the fractional scale factor a in FIG. 6 is a=0.5. As shown in FIG. 6, a curve with a square mark is used to represent a sampling sequence after being fractionally scaled by ½. The amplitude of the first timing point on the fractionally scaled sampling sequence is $a\times V_{TD1}=40$. It can be learned from FIG. 6 that when the moment Ta at which the rising edge of the original sampling sequence reaches $a*V_{TD1}=40$ is Ta=6.4, the delay factor $\Delta T=T_{D1}-Ta=7-6.4=0.6$.

It should be noted that, to obtain a more precise moment, interpolation may be performed on an original sampling sequence curve, to obtain a sampling sequence after interpolation, and the moment Ta is selected from the sampling sequence after interpolation. For example, a curve with an x mark in FIG. 6 represents a sequence obtained by interpolating the sampling sequence. An interpolation manner is not limited in this embodiment of this application. For example, an interpolation manner such as cubic spline (cubic spline) interpolation or linear (linear) interpolation may be used.

S605: Calculate a second timing point based on the fractional scale factor a, the delay factor ΔT, and the pulse waveform of the transmit signal.

In a process of calculating the second timing point, the pulse waveform of the transmit signal may be first multiplied by the fractional scale factor a, to obtain a fractionally scaled pulse waveform of the transmit signal. Then, the pulse waveform of the transmit signal is translated to the right based on the delay factor ΔT, to obtain a delayed pulse waveform of the transmit signal. Then, an intersection point between the fractionally scaled pulse waveform of the transmit signal and the delayed pulse waveform of the transmit signal is determined as the second timing point.

For example, FIG. 8 is a schematic diagram of a waveform of a transmit signal according to an embodiment of this application. In FIG. 8, a horizontal axis represents time, and a vertical axis represents an amplitude. A solid line in FIG. 8 represents a transmit signal that is fractionally scaled by 50%, that is, a fractional scale factor a is 0.5. A dashed line represents a delayed transmit signal, and a delay factor ΔT is 0.6. An intersection point between the fractionally scaled transmit signal waveform and the delayed transmit signal waveform is the second timing point of the transmit signal. It can be learned from FIG. 8 that the intersection point is a moment 17, that is, the second timing point is located at the moment 17.

Optionally, the intersection point may be determined according to the following formula (3):

$$\hat{t} = \underset{t}{\mathrm{argmin}} |f(t - \Delta T) - a \times f(t)|, \tag{3}$$

f(t−ΔT) represents the delayed pulse waveform, a×f(t) represents the fractionally scaled pulse waveform, and t represents a moment of the intersection point. The formula (3) indicates that t is a moment at which a difference between the two pulse signals is the smallest.

S606: Calculate time of flight based on the first timing point and the second timing point.

The time of flight may be represented as $T = T_{TD1} - T_{D2}$.

S607: Calculate a distance R between the radar and the target object based on the time of flight.

For example, the distance R is calculated according to the formula $R = (T_{TD1} - T_{D2}) * c/2$.

In this embodiment of this application, in a radar ranging process, after the sampling sequence of the saturated echo signal is obtained, the first timing point may be selected from the sampling points of the sampling sequence, the delay factor ΔT is determined based on the preset fractional scale factor a and the first timing point, and then the second timing point is determined based on the fractional scale factor a and the delay factor ΔT. Because the first timing point is selected from the sampling points on the rising edge of the saturated sampling sequence, moment information and amplitude information that correspond to the first timing point are true information on the echo signal. In this manner, when the saturated echo signal is received, precision of determining the time of flight is improved, thereby further improving radar ranging precision. In addition, the timing point is determined based on the fractional scale factor a and the delay factor ΔT, and this can reduce impact of the saturated echo signal on determining a location of the timing point, improve precision of determining a relative location of the second timing point, and further improve radar ranging precision.

When a saturation degree of the echo signal is severe, a quantity of unsaturated sampling points on the rising edge of the echo signal is quite small, and there is also a relatively large error in the method for determining the timing point based on the fractional scale factor a and the delay factor ΔT. Consequently, a corresponding timing point cannot be precisely found on the transmit signal. This case is referred to as timing ambiguity.

Figure 9:
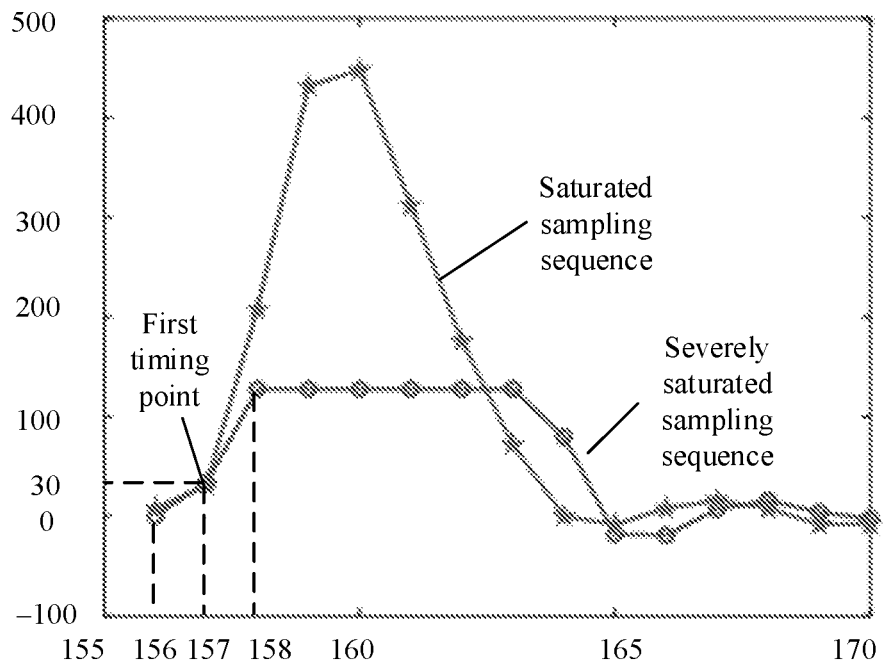
FIG. 9 is a schematic diagram of a saturated sampling sequence according to another embodiment of this application.

FIG. 9 is a schematic diagram of a saturated sampling sequence according to another embodiment of this application. In FIG. 9, a horizontal axis represents time, and a vertical axis represents an amplitude. A solid line with a circle mark represents a saturated sampling sequence with a relatively severe saturation degree, and a solid line with a pentagonal star mark represents a saturated sampling sequence with a relatively light saturation degree. As shown in FIG. 9, when a saturation degree is severe, there is only one unsaturated sampling point on a rising edge of a sampling sequence, namely, a sampling point at a moment 157. An amplitude (amplitude>$V_{max}$) of a sampling point at a moment 158 is saturated, and an amplitude (amplitude<$V_{min}$) of a sampling point at a moment 156 is still quite low. In this case, there are quite few sampling points available for interpolation, and a deviation brought by interpolation is also relatively high. Consequently, there is a relatively large error in a method for determining a timing point based on a fractional scale factor a and a delay factor ΔT.

Figure 10A:
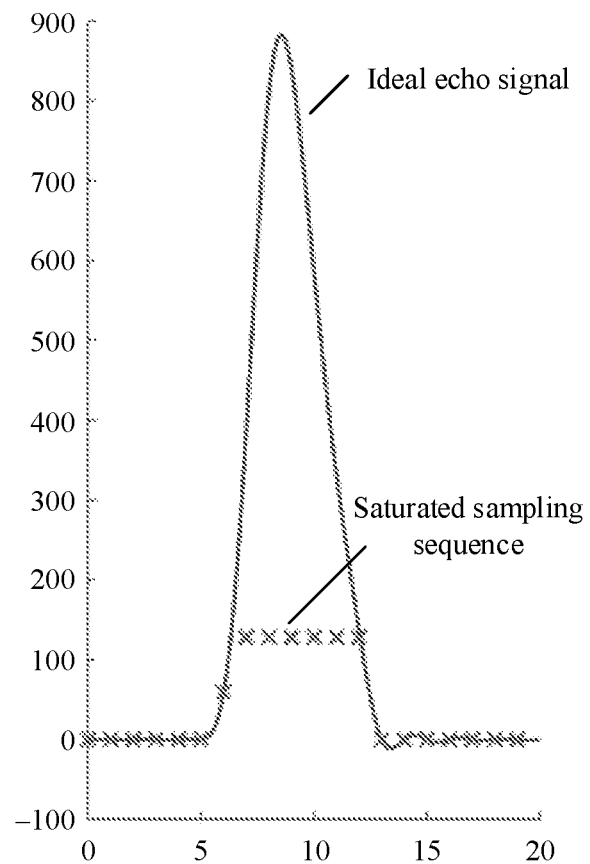
FIG. 10(a) and FIG. 10(b) are schematic diagrams of saturated sampling sequences according to another embodiment of this application.
Figure 10B:
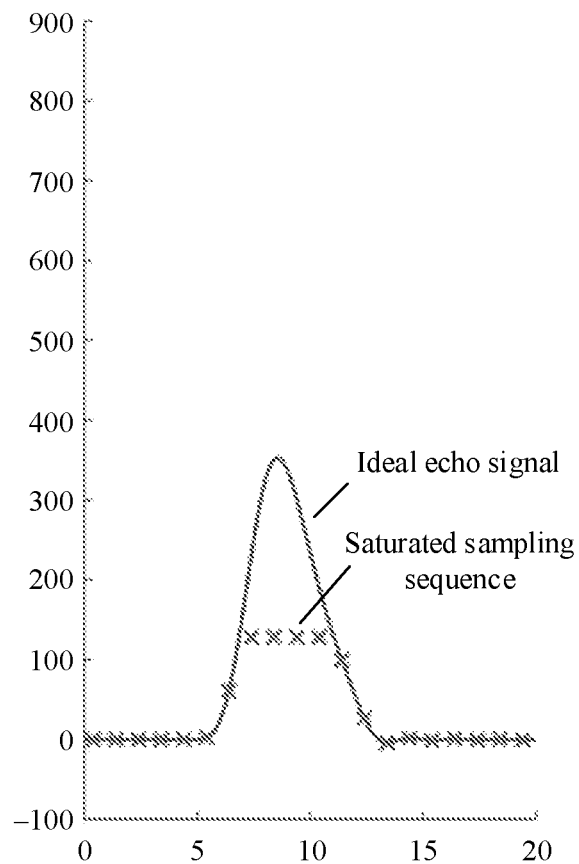

FIG. 10(a) and FIG. 10(b) are schematic diagrams of saturated sampling sequences according to another embodiment of this application. In FIG. 10(a) and FIG. 10(b), a horizontal axis represents time, and a vertical axis represents an amplitude. FIG. 10(a) and FIG. 10(b) show schematic diagrams of ideal echo signals and corresponding saturated sampling sequences of different waveforms. A solid line in the figure represents an ideal echo signal, and a curve with an x mark represents a sampling sequence of a saturated echo signal received by a radar. A rising edge part of the saturated sampling sequence in FIG. 10(a) is the same as that in FIG. 10(b). It can be learned that timing points of same saturated sampling sequences may correspond to different locations of transmit signals. Therefore, when a saturation degree is relatively severe, it is difficult to determine a timing point corresponding to the saturated echo signal on the transmit signal based on the saturated sampling sequence of the echo signal. This causes timing ambiguity.

To improve timing ambiguity, this embodiment of this application further provides a manner of determining a second timing point on a transmit signal based on a confidence interval, to reduce timing ambiguity. The following describes this method with reference to FIG. 11 and FIG. 12.

FIG. 11 is a schematic diagram of a radar ranging method according to another embodiment of this application. FIG. 11 shows a method for determining a second timing point based on a confidence interval. The method is applicable to a scenario in which a saturation degree of an echo signal is relatively severe, for example, a case in which a rising edge of a saturated sampling sequence includes only one saturated sampling point or does not include an unsaturated sampling point. As shown in FIG. 11, the method includes the following steps.

S701: Obtain a pulse waveform of a transmit signal.

For example, a storage device in a radar may prestore a pulse waveform of a reference signal. A processing unit in the radar may obtain the pulse waveform of the reference signal from the storage device, and obtain the pulse waveform of the transmit signal in combination with a trigger moment of the transmit signal. Alternatively, after a signal sent by the radar to a target object is split, a small part of the signal that is split is returned to the radar through a reference optical path with a fixed delay, and the part of the signal is a split signal. The radar may translate a waveform of the split signal based on a fixed delay to obtain the pulse waveform of the transmit signal.

S702: Obtain a sampling sequence of a saturated echo signal.

For example, the sampling sequence is a sampling sequence after ADC sampling.

Content of S701 and S702 is the same as or similar to content of S101 or S102 in FIG. 5. For brevity, details are not described herein again.

S703: Select a first timing point from sampling points of the sampling sequence.

For example, a first sampling point that is the first sampling point, on a rising edge of the sampling sequence, greater than a minimum amplitude threshold $V_{min}$ is first determined, and then a second sampling point that is the last sampling point, on the rising edge, less than a saturation threshold $V_{max}$ is determined. A sampling point located between the first sampling point and the second sampling point is an unsaturated sampling point located on the rising edge of the echo signal. A sampling point may be randomly selected from unsaturated sampling points as the first timing point.

Optionally, if the rising edge of the sampling sequence includes only one unsaturated sampling point, the unsaturated sampling point may be selected as the first timing point. If a saturation degree is severe, and the rising edge of the sampling sequence does not include an unsaturated sampling point, the first saturated sampling point on the rising edge of the sampling sequence may be selected as the first timing point.

For example, in FIG. 9, if a saturated sampling sequence with a circle mark includes only one unsaturated sampling point, the unsaturated sampling point may be selected as the first timing point. A moment of the first timing point is $T_{D1}=157$, and an amplitude is $V_{TD1}=30$.

S704: Determine a confidence space of the second timing point on the pulse waveform of the transmit signal.

The confidence space of the second timing point may be determined by using a boundary condition satisfied by the second timing point. For example, the boundary condition may include but is not limited to at least one of the following: An amplitude of a previous sampling point of the first timing point is 0 (amplitude<$V_{min}$); a next sampling point of the first timing point is a saturated sampling point (amplitude>$V_{max}$); and that an amplitude of the transmit signal at a moment T5 reaches the saturation threshold $V_{max}$ is a little probability event, and the moment T5 may be a preset moment in a time interval corresponding to the pulse waveform of the transmit signal. The moment T5 may be any moment in the foregoing time interval.

It should be noted that the foregoing boundary condition is merely used as an example, and the confidence space of the second timing point may also be determined based on another boundary condition satisfied by the second timing point.

FIG. 12 is a schematic diagram of a confidence interval of a second timing point according to an embodiment of this application. In FIG. 12, a horizontal axis represents time, and a vertical axis represents an amplitude. As shown in FIG. 12, a first confidence space [T1, T2] with a relatively large range may be first calculated, and then a left boundary and a right boundary of the first confidence space are gradually fractionally scaled until a confidence interval [T3, T4] of the second timing point is obtained. Next, a process of determining the confidence space is described.

(1) Determine a left boundary moment T1 of the first confidence space [T1, T2] of the second timing point.

In steps (1) and (2), it may be understood that the first confidence interval [T1, T2] of the second timing point is determined based on a first boundary condition, where the first boundary condition includes: An amplitude of a previous sampling point of the first timing point is 0.

T1 is a moment at which an amplitude of the transmit signal reaches a threshold $V_{tx,min}$, $V_{tx,min}=k \times V_{TD1}$, $V_{TD1}$ represents an amplitude of the first timing point on the saturated sampling sequence, k is a preset constant, and 0<k<1.

Optionally, V may be selected as far as possible as a location (where an amplitude is 0) at a previous sampling point close to the first timing point on the transmit signal, that is, $V_{tx,min}$ may be a value as small as possible (or a value as close to 0 as possible). An amplitude of k may be determined based on specific practice. As an example, k may be set to be less than or equal to the following values: 0.1%, 1%, 2%, 3%, 5%, 8%, 10%, 20%, 30%, and the like.

For example, in FIG. 9, the amplitude of the previous sampling point of the first timing point is 0, and the amplitude $V_{TD1}$ of the first timing point is 30. It is assumed that k=2%, and $V_{tx,min}=V_{T0}+k \times (V_{TD1}-V_{T0})=2\% \times 30=0.6$. In this case, in FIG. 12, the left boundary moment T1 of the first confidence interval at the second timing point is a moment at which $V_{T1}=0.6$.

(2) Determine a right boundary moment T2 of the first confidence space [T1, T2] of the second timing point.

$T2=T1+T_S$, and $T_S$ represents a sampling time interval of the echo signal. For example, as shown in FIG. 12, the sampling interval of the echo signal is $T_S=1$ ns (nanosecond). It is assumed that a moment of the second timing point is represented by $T_{D2}$. In this case, $T_{D2} \in [T1, T2]$.

Theoretically, the first timing point that is of the echo signal and that corresponds to a location (namely, the second timing point) of the transmit signal needs to be located in the interval [T1, T2]. Because it can be learned from the saturated sampling sequence that the location of the first timing point is a value greater than 0, it can be determined that the location that is of the second timing point and that corresponds to the transmit signal is necessarily at a location on the right of T1. Because the amplitude $V_{tx,min}$ corresponding to the moment T1 of the transmit signal is a value close to zero, it may be considered that an amplitude of the sampling point on the left of T1 is 0. In addition, it can be learned from FIG. 9 that, an amplitude of the sampling point at $T_{D1}-T_S=157-1=156$ is 0 or close to 0. Therefore, the location of the second timing point on the transmit signal is necessarily located on the left of the moment T2. Otherwise, the previous sampling point of the first timing point is located on the right of T1, and the amplitude of the previous sampling point of the first timing point is greater than 0. This is inconsistent with the fact.

It should be noted that after step (2) is completed, the first confidence space [T1, T2] may be used as the confidence interval of the second timing point. Alternatively, starting from step (3), the left boundary and the right boundary of the first confidence interval [T1, T2] may be further fractionally scaled, to obtain a confidence space with a smaller range, thereby obtaining a more precise second timing point.

(3) Fractionally scale the right boundary of the confidence interval of the second timing point to a moment T4.

In step (3), it may be understood that a right boundary moment T4 of a confidence interval [T3, T4] of the second timing point is determined based on the first confidence interval [T1, T2] and a second boundary condition, where the second boundary condition includes: A next sampling point of the first timing point is a saturated sampling point.

Optionally, movement to the left starting from T2 is performed, to detect whether different time points can be excluded from the confidence interval. Assuming that a current detected time point is $T_X$, and the amplitude of the transmit signal is represented as $V_{TX}(T_X)$, it may be detected whether $T_X$ satisfies a condition of the confidence interval according to formula (4):

$$\hat{V} = V_{TD1} \frac{V_{TX}(T_X + T_S)}{V_{TX}(T_X)} \quad (4)$$

$T_X$ represents a moment on the left of the moment T1, $V_{TD1}$ represents an amplitude of the first timing point on the saturated sampling sequence, $V_{TX}(T_X)$ represents an amplitude of the transmit signal at the moment $T_X$, and $V_{TX}(T_X+T_S)$ represents an amplitude of the transmit signal at the moment $T_X+T_S$. $T_S$ represents a sampling interval of the saturated sampling sequence, and $\hat{V}$ represents a predicted value of the saturated sampling sequence of the echo signal at a next sampling point of the first timing point.

The moment T4 is the moment $T_X$ at which $\hat{V}$ reaches the saturation threshold $V_{max}$ of the saturated sampling sequence. Because a next sampling point of the second timing point is a saturated sampling point, if $\hat{V}$ does not reach the saturation threshold $V_{max}$ of the saturated sampling sequence, it indicates that the currently detected moment $T_X$ does not satisfy the confidence interval. Because a next sampling point after the first timing point of the known echo signal is a saturated sampling point, and the moment $T_X$ cannot satisfy this condition, next, a moment on the left of the moment $T_X$ may be continued to be detected until a moment at which the predicted value $\hat{V}$ reaches the saturation threshold $V_{max}$ is found, and the moment may be recorded as T4.

After step (3), the confidence interval of the second timing point may be fractionally scaled to [T1, T4].

(4) Fractionally scale the left boundary of the confidence interval of the second timing point to a moment T3.

In step (4), it may be understood that a left boundary moment T3 of the confidence interval [T3, T4] of the second timing point is determined based on the first confidence interval [T1, T2] and a third boundary condition, where the third boundary condition includes: That an amplitude of the transmit signal at a preset saturation alert point reaches the saturation threshold $V_{max}$ is a little probability event.

First, a saturation alert point is selected on the transmit signal, the saturation alert point is at a moment T5 at which the signal is transmitted, and it is preset that the following case is a little probability event: The echo signal is severely saturated, so that the amplitude $V_{TX}(T5)$ of the transmit signal at the moment T5 corresponding to the saturation alert point reaches a saturation degree. Therefore, a case in which $V_{TX}(T5)$ reaches the saturation degree may be not considered. The moment T5 may be a preset moment in a time interval corresponding to the pulse waveform of the transmit signal. It should be noted that a selection condition of the moment T5 is not limited in this application. In FIG. 12, the moment T5 is located in the first confidence space [T1, T2]. However, the moment T5 may also be set at a location of the moment T5 outside the first confidence space [T1, T2].

Based on the foregoing third boundary condition, movement to the right starting from the moment T1 is performed, to detect whether different time points can be excluded from the confidence interval. It is assumed that a current detected moment is $T_y$, and whether $T_y$ causes the saturation alert point at a corresponding location on the sampling sequence may be determined. If saturation is not caused, this satisfies a preset condition, and $T_y$ belongs to the confidence interval. If saturation is caused, this does not satisfy a preset condition, and $T_y$ is outside the confidence interval. The condition that whether $T_y$ satisfies the confidence interval may be calculated according to formula (5):

$$\hat{V}_{T5} = V_{TD1} \frac{V_{TX}(T5)}{V_{TX}(T_y)}, \quad (5)$$

$V_{TD1}$ represents an amplitude of the saturated sampling sequence of the echo signal at the first timing point, $V_{TX}(T_y)$ represents an amplitude of the transmit signal at the moment $T_y$, $V_{TX}(T5)$ represents an amplitude of the transmit signal at the moment T5, and $\hat{V}_{T5}$ indicates a predicted value of an amplitude of the saturation alert point on the sampling sequence.

If $\hat{V}_{T5}$ exceeds the saturation threshold $V_{max}$, it indicates that the currently detected moment $T_y$ does not belong to the confidence interval. Because if the second timing point is located at $V_y$, the saturation alert point T5 reaches the saturation threshold $V_{max}$, and this does not satisfy the preset condition. In this case, a moment on the right of current $T_y$ may continue to be detected according to formula (5) until the moment $T_y$ at which the predicted value $\hat{V}_{T5}$ reaches the saturation threshold $V_{max}$ is found, and the moment Ty is recorded as the moment T3.

After step (4), the confidence interval of the second timing point may be fractionally scaled to [T3, T4], where [T3, T4]∈ [T1, and T2].

S705: Determine the second timing point based on the confidence space of the second timing point.

The second timing point may be determined in a plurality of manners. For example, any moment in the confidence space [T3, T4] may be selected as the second timing point. Alternatively, an average value of the confidence space [T3, T4] may be selected as the second timing point.

For example, the moment of the second timing point may be represented as $$T_{D2} = \frac{T3 + T4}{2},$$

where $T_{D2}$ represents the moment of the second timing point, T3 represents the left boundary moment of the confidence interval, and T4 represents the right boundary moment of the confidence interval.

S706: Calculate the distance between the radar and the target object based on the first timing point and the second timing point.

For example, the second timing point is used as an average value of the confidence space [T3, T4], and the distance may be calculated according to formula (6).

$$R = \frac{\left(T_{D1} - \frac{T3 + T4}{2}\right)}{2} \times c \qquad (6)$$

R represents the distance, $T_{D1}$ represents the moment of the first timing point, $T_{D2}$ represents the moment of the second timing point, and c represents the light speed.

In this embodiment of this application, the first timing point may be first selected on the sampling sequence of the saturated echo signal, then the confidence interval of the second timing point is determined on the transmit signal based on the first timing point, and the second timing point is determined based on the confidence interval, to calculate the distance between the radar and the target object. When the saturation degree of the saturated echo signal is relatively severe, the confidence space of the second timing point is calculated by a boundary condition, and the location of the second timing point is determined. This can reduce timing ambiguity and improve radar ranging precision.

Figure 13:
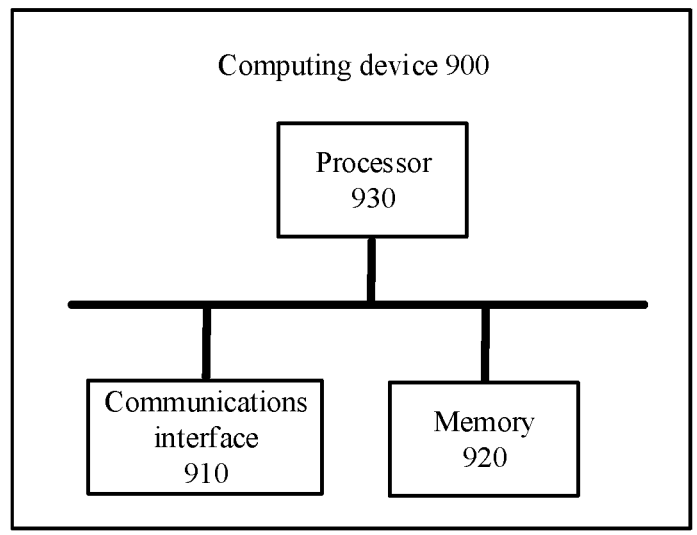
FIG. 13 is a schematic diagram of a structure of a computing device 900 according to an embodiment of this application.

FIG. 13 is a schematic diagram of a structure of a computing device 900 according to another embodiment of this application. The computing device 900 may be configured to perform the method or the step performed by the processing unit 210 or the signal processing and control unit 310 in the method embodiments of this application. For example, the computing device 900 may perform the method described in FIG. 5, FIG. 7, or FIG. 11. The computing device 900 includes:
- a communications interface 910;
- a memory 920, configured to store a computer program; and
- a processor 930, configured to execute the computer program in the memory 920.

When the program is executed, the processor 930 is configured to: obtain a pulse waveform of a transmit signal, where the transmit signal is a signal sent to a target object by a radar; obtain a sampling sequence of an echo signal, where the echo signal is a reflection signal of the target object that is received by the radar, and the echo signal is a saturated echo signal; determine a first timing point in at least one sampling point on a rising edge of the sampling sequence, where the first timing point is used to indicate a receive moment of the echo signal; determine a second timing point based on the first timing point and the pulse waveform of the transmit signal, where the second timing point is used to indicate a transmit moment of the transmit signal; and calculate a distance between the radar and the target object based on the first timing point and the second timing point.

It should be understood that the computing device shown in FIG. 13 may be a device, a chip, or a circuit, for example, a chip or a circuit that may be disposed inside a terminal device or a vehicle-mounted device. The processor 930, the memory 920, and the communications interface 910 are connected through a bus system. In an implementation, the processor 930 may be implemented through a dedicated processing chip, a processing circuit, a processor, or a general-purpose chip. For example, the processor 930 may include a central processing unit (central processor unit, CPU), a combination of one or more microprocessors, a digital signal processor (digital signal processing, DSP), and the like.

Figure 14:
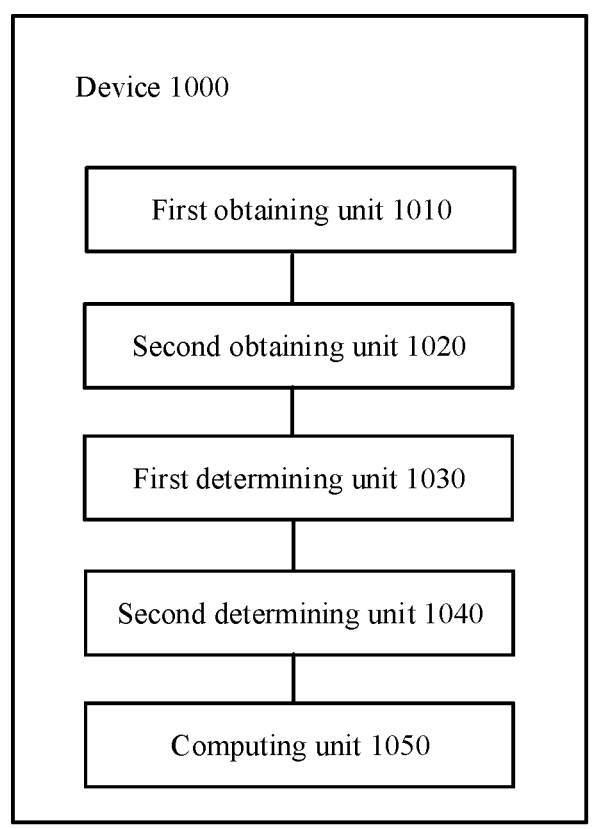
FIG. 14 is a schematic diagram of a structure of a device 1000 according to an embodiment of this application.

FIG. 14 is a schematic diagram of a structure of a device 1000 according to another embodiment of this application. The device 1000 may be configured to perform the method or the step performed by the processing unit 210 or the signal processing and control unit 310 in the method embodiments of this application. For example, the device 1000 may perform the method described in FIG. 5, FIG. 7, or FIG. 11. The device 1000 includes: a first obtaining unit 1010, configured to obtain a pulse waveform of a transmit signal, where the transmit signal is a signal sent to a target object by a radar; a second obtaining unit 1020, configured to obtain a sampling sequence of an echo signal, where the echo signal is a reflection signal of the target object that is received by the radar, and the echo signal is a saturated echo signal; a first determining unit 1030, configured to determine a first timing point in at least one sampling point on a rising edge of the sampling sequence, where the first timing point is used to indicate a receive moment of the echo signal; a second determining unit 1040, configured to determine a second timing point based on the first timing point and the pulse waveform of the transmit signal, where the second timing point is used to indicate a transmit moment of the transmit signal; and a computing unit 1050, configured to calculate a distance between the radar and the target object based on the first timing point and the second timing point.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division in an actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The foregoing units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A radar ranging method, comprising:
    obtaining a pulse waveform of a transmit signal, wherein the transmit signal is a signal sent to a target object by a radar;
    obtaining a sampling sequence of an echo signal, wherein the echo signal is a reflection signal of the target object that is received by the radar, and the echo signal is a saturated echo signal;
    determining a first timing point in at least one sampling point on a rising edge of the sampling sequence, wherein the first timing point indicates a receive moment of the echo signal;
    determining a second timing point based on the first timing point and the pulse waveform of the transmit signal, wherein the second timing point indicates a transmit moment of the transmit signal, and determining the second timing point based on the first timing point and the pulse waveform of the transmit signal comprises:
        determining a confidence interval of the second timing point on the pulse waveform of the transmit signal based on the first timing point and one or more boundary conditions, wherein the one or more boundary conditions comprise at least one of (1) an amplitude of a previous sampling point of the first timing point is 0, (2) a next sampling point of the first timing point is a saturated sampling point, or (3) an amplitude of the transmit signal at a preset saturation alert point reaches a saturation threshold $V_{max}$ is a little probability event; and
        determining the second timing point based on the confidence interval of the second timing point; and
    calculating a distance between the radar and the target object based on the first timing point and the second timing point.

2. The method according to claim 1, wherein the determining a first timing point in at least one sampling point on a rising edge of the sampling sequence comprises:
    determining the first timing point in at least one unsaturated sampling point on the rising edge of the sampling sequence.

3. The method according to claim 2, wherein the first timing point is a last unsaturated sampling point in the at least one unsaturated sampling point on the rising edge of the sampling sequence.

4. The method according to claim 1, wherein the determining a first timing point in at least one sampling point on a rising edge of the sampling sequence comprises:
    in response to determining that the rising edge of the sampling sequence comprises only one unsaturated sampling point, determining the unsaturated sampling point as the first timing point; or
    in response to determining that the rising edge of the sampling sequence does not comprise an unsaturated sampling point, determining a first saturated sampling point on the rising edge of the sampling sequence as the first timing point.

5. The method according to claim 4, wherein the determining a confidence interval of the second timing point on the pulse waveform of the transmit signal based on the first timing point comprises:
    determining a first confidence interval [T1, T2] of the second timing point based on a first boundary condition, wherein the first boundary condition comprises that the amplitude of the previous sampling point of the first timing point is 0;
    determining a right boundary moment T4 of a confidence interval [T3, T4] of the second timing point based on the first confidence interval [T1, T2] and a second boundary condition, wherein [T3, T4]∈[T1, T2], and the second boundary condition comprises that the next sampling point of the first timing point is a saturated sampling point; and
    determining a left boundary moment T3 of the confidence interval [T3, T4] of the second timing point based on the first confidence interval [T1, T2] and a third boundary condition, wherein the third boundary condition comprises that the amplitude of the transmit signal at the preset saturation alert point reaches the saturation threshold $V_{max}$ is a little probability event.

6. The method according to claim 5, wherein the determining a first confidence interval [T1, T2] of the second timing point based on a first boundary condition comprises:
    determining the first confidence interval [T1, T2] of the second timing point based on the first boundary condition, wherein T1 is a moment at which an amplitude of the transmit signal reaches a threshold $V_{tx,min}$, $V_{tx,min}=k \times V_{TD1}$, $V_{TD1}$ represents an amplitude of the first timing point on the sampling sequence, 0<k<1, T2=T1+Ts, and Ts represents a sampling interval of the sampling sequence.

7. The method according to claim 5, wherein the determining a right boundary moment T4 of a confidence interval [T3, T4] of the second timing point based on the first confidence interval [T1, T2] and a second boundary condition comprises:
    determining the right boundary moment T4 of the confidence interval [T3, T4] of the second timing point according to the following formula:

$$\hat{V} = V_{TD1} \frac{V_{TX}(T_X + T_S)}{V_{TX}(T_X)},$$

wherein
  $T_x$ represents a moment on the left of a moment T1, $V_{TD1}$ represents the amplitude of the first timing point on the sampling sequence, $V_{TX}(T_X)$ represents an amplitude of the transmit signal at a moment $T_X$, $V_{TX}(T_X+T_S)$ represents an amplitude of the transmit signal at the moment $T_X+T_S$, $T_S$ represents a sampling interval of the sampling sequence, and $\hat{V}$ represents a predicted value of the sampling sequence at the next sampling point of the first timing point; and
  the moment T4 is the moment $T_X$ at which $\hat{V}$ reaches the saturation threshold $V_{max}$ of the sampling sequence.

8. The method according to claim 5, wherein the determining a left boundary moment T3 of the confidence interval [T3, T4] of the second timing point based on the first confidence interval [T1, T2] and a third boundary condition comprises:
  determining the left boundary moment T3 of the confidence interval [T3, T4] according to the following formula:

$$\hat{V}_{T5} = V_{TD1} \frac{V_{TX}(T5)}{V_{TX}(T_y)},$$

wherein
  $V_{TD1}$ represents the amplitude of the first timing point on the sampling sequence, $V_{TX}(T_y)$ represents an amplitude of the transmit signal at a moment $T_y$, $V_{TX}(T5)$ represents an amplitude of the transmit signal at a moment T5, the moment T5 is a moment at which a saturation alert point is on the transmit signal, and $\hat{V}_{T5}$ represents a predicted value of an amplitude of the saturation alert point on the sampling sequence; and
  the left boundary moment T3 is the moment $T_y$ at which $\hat{V}_{T5}$ is lower than the saturation threshold $V_{max}$ of the sampling sequence.

9. The method according to claim 5, wherein the determining the second timing point based on the confidence interval of the second timing point comprises:
  determining the second timing point according to the following formula:

$$T_{D2} = \frac{T3 + T4}{2},$$

wherein
  $T_{D2}$ represents a moment of the second timing point, T3 represents the left boundary moment of the confidence interval, and T4 represents the right boundary moment of the confidence interval.

10. The method according to claim 1, wherein the calculating a distance between the radar and the target object based on the first timing point and the second timing point comprises:
  determining the distance according to the following formula:

$R=(T_{D1}-T_{D2})\times c/2$, wherein

R represents the distance, $T_{D1}$ represents a moment of the first timing point, $T_{D2}$ represents a moment of the second timing point, and c represents a light speed.

11. The method according to claim 1, wherein the obtaining a pulse waveform of a transmit signal comprises:
  obtaining a pulse waveform of a reference signal, wherein the reference signal is a prestored ideal waveform of the transmit signal; and
  obtaining the pulse waveform of the transmit signal based on the pulse waveform of the reference signal and a trigger moment of the transmit signal.

12. The method according to claim 1, wherein the obtaining a pulse waveform of a transmit signal comprises:
  obtaining a pulse waveform of a split signal, wherein the split signal is a signal obtained by splitting the transmit signal, and the split signal returns to the radar through an optical fiber reference optical path with a fixed delay; and
  translating the pulse waveform of the split signal based on the fixed delay, to obtain the pulse waveform of the transmit signal.

13. A radar ranging device, comprising:
one or more processors, and
one or more memories including programming instructions that, when executed by the one or more processors, cause the radar ranging device to perform operations comprising:
  obtaining a pulse waveform of a transmit signal, wherein the transmit signal is a signal sent to a target object by a radar;
  obtaining a sampling sequence of an echo signal, wherein the echo signal is a reflection signal of the target object that is received by the radar, and the echo signal is a saturated echo signal;
  determining a first timing point in at least one sampling point on a rising edge of the sampling sequence, wherein the first timing point indicates a receive moment of the echo signal;
  determining a second timing point based on the first timing point and the pulse waveform of the transmit signal, wherein the second timing point indicates a transmit moment of the transmit signal, and determining the second timing point based on the first timing point and the pulse waveform of the transmit signal comprises:
    determining a confidence interval of the second timing point on the pulse waveform of the transmit signal based on the first timing point and one or more boundary conditions, wherein the one or more boundary conditions comprise at least one of (1) an amplitude of a previous sampling point of the first timing point is 0, (2) a next sampling point of the first timing point is a saturated sampling point, or (3) an amplitude of the transmit signal at a preset saturation alert point reaches a saturation threshold $V_{max}$ is a little probability event; and
    determining the second timing point based on the confidence interval of the second timing point; and
  calculating a distance between the radar and the target object based on the first timing point and the second timing point.

14. The radar ranging device according to claim 13, wherein the operations further comprise:
  determining the first timing point in at least one unsaturated sampling point on the rising edge of the sampling sequence.

15. The radar ranging device according to claim 13, wherein the first timing point is a last unsaturated sampling point in at least one unsaturated sampling point on the rising edge of the sampling sequence.

16. The radar ranging device according to claim 13, wherein the operations further comprise:
- determining a confidence interval of the second timing point on the pulse waveform of the transmit signal based on the first timing point; and
- determining the second timing point based on the confidence interval of the second timing point.

17. A radar ranging method, comprising:
- obtaining a pulse waveform of a transmit signal, wherein the transmit signal is a signal sent to a target object by a radar;
- obtaining a sampling sequence of an echo signal, wherein the echo signal is a reflection signal of the target object that is received by the radar, and the echo signal is a saturated echo signal;
- determining a first timing point in at least one sampling point on a rising edge of the sampling sequence, wherein the first timing point indicates a receive moment of the echo signal;
- determining a second timing point based on the first timing point and the pulse waveform of the transmit signal, wherein the second timing point indicates a transmit moment of the transmit signal, and determining the second timing point based on the first timing point and the pulse waveform of the transmit signal comprises:
  - fractionally scaling an amplitude of the sampling sequence based on a preset fractional scale factor a, to obtain a fractionally scaled sampling sequence, wherein 0<a<1;
- calculating a delay factor $\Delta T$, wherein $\Delta T = T_{D1} - Ta$, Ta represents a moment at which an amplitude of the fractionally scaled sampling sequence reaches $a \times V_{TD1}$, $V_{TD1}$ represents an amplitude of the first timing point on the sampling sequence, and $T_{D1}$ represents a moment of the first timing point; and
- calculating the second timing point based on a fractional scale factor a, the delay factor $\Delta T$, and the pulse waveform of the transmit signal; and
- calculating a distance between the radar and the target object based on the first timing point and the second timing point.

18. The method according to claim 17, wherein the calculating the second timing point based on the fractional scale factor a, the delay factor $\Delta T$, and the pulse waveform of the transmit signal comprises:
- fractionally scaling an amplitude of the pulse waveform of the transmit signal based on the fractional scale factor a, to obtain a fractionally scaled pulse waveform;
- translating the pulse waveform of the transmit signal based on the delay factor $\Delta T$, to obtain a delayed pulse waveform;
- calculating an intersection point between the fractionally scaled pulse waveform and the delayed pulse waveform; and
- determining the intersection point as the second timing point.

19. The method according to claim 18, wherein the calculating an intersection point between the fractionally scaled pulse waveform and the delayed pulse waveform comprises:
- determining the intersection point according to the following formula:

$$\hat{t} = \operatorname*{argmin}_{t} |f(t - \Delta T) - a \times f(t)|,$$

wherein
f(t−$\Delta T$) represents the delayed pulse waveform, a×f(t) represents the fractionally scaled pulse waveform, and $\hat{t}$ represents a moment of the intersection point.

* * * * *

UNITED STATES PATENT AND TRADEMARK OFFICE
CERTIFICATE OF CORRECTION

| | | |
|---|---|---|
| PATENT NO. | : 12,241,968 B2 | Page 1 of 1 |
| APPLICATION NO. | : 17/845337 | |
| DATED | : March 4, 2025 | |
| INVENTOR(S) | : Qiang Li and Hongying Wu | |

It is certified that error appears in the above-identified patent and that said Letters Patent is hereby corrected as shown below:

In the Claims

In Column 33, In Line 7, Claim 7, delete "$T_x$" and insert -- $T_X$ --.

In Column 33, In Line 12, Claim 7, delete "$T_x+T_s$," and insert -- $T_X+T_S$, --.

In Column 36, In Line 37, Claim 19, delete "î" and insert -- $\hat{t}$ --.

Signed and Sealed this
Twenty-second Day of July, 2025

Coke Morgan Stewart
*Acting Director of the United States Patent and Trademark Office*